(12) United States Patent
Fujii et al.

(10) Patent No.: US 8,163,366 B2
(45) Date of Patent: Apr. 24, 2012

(54) WRITE-ONCE-READ-MANY OPTICAL RECORDING MEDIUM

(75) Inventors: Toshishige Fujii, Yokohama (JP);
Noboru Sasa, Yokohama (JP);
Yoshitaka Hayashi, Yokohama (JP);
Hiroshi Miura, Yokohama (JP);
Masayuki Fujiwara, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 1034 days.

(21) Appl. No.: 11/793,075

(22) PCT Filed: Dec. 13, 2005

(86) PCT No.: PCT/JP2005/023201
§ 371 (c)(1),
(2), (4) Date: Apr. 25, 2008

(87) PCT Pub. No.: WO2006/064932
PCT Pub. Date: Jun. 22, 2006

(65) Prior Publication Data
US 2009/0011169 A1 Jan. 8, 2009

(30) Foreign Application Priority Data

Dec. 15, 2004 (JP) ................................ 2004-363010
Nov. 22, 2005 (JP) ................................ 2005-336573

(51) Int. Cl.
*B32B 3/02* (2006.01)
(52) U.S. Cl. .................. 428/64.1; 428/64.4; 430/270.12
(58) Field of Classification Search ................. 428/64.4; 430/270.12
See application file for complete search history.

(56) References Cited

U.S. PATENT DOCUMENTS

| 5,514,440 | A | 5/1996 | Gotoh et al. |
| 5,633,106 | A | 5/1997 | Aihara et al. |
| 7,057,252 | B2 * | 6/2006 | Uno et al. ..................... 257/432 |
| 2001/0006035 | A1 | 7/2001 | Ueno et al. |
| 2004/0265532 | A1 * | 12/2004 | Sasa et al. ..................... 428/64.4 |
| 2006/0003136 | A1 | 1/2006 | Sasa et al. |

FOREIGN PATENT DOCUMENTS

EP 0676751 A1 10/1995

(Continued)

OTHER PUBLICATIONS

Oct. 21, 2008 European search report in connection with a counterpart European patent application No. 05 81 6657.

(Continued)

*Primary Examiner* — Elizabeth Mulvaney
(74) *Attorney, Agent, or Firm* — Cooper & Dunham LLP

(57) ABSTRACT

The present invention provides a write-once-read-many optical recording medium comprising a substrate, a recording layer comprising any one of bismuth and an oxide of bismuth, an overcoat layer and a reflective layer in this order from a laser beam incident plane, wherein the write-once-read-many optical recording medium has a reflectivity of 35% or less when a laser is applied to the flat part of the substrate or a write-once-read-many optical recording medium comprising a substrate, an undercoat layer, a recording layer comprising any one of bismuth and an oxide of bismuth, an overcoat layer and a reflective layer in this order from a laser beam incident plane, wherein the write-once-read-many optical recording medium has a reflectivity of 35% or less when a laser is applied to the flat part of the substrate.

20 Claims, 11 Drawing Sheets

FOREIGN PATENT DOCUMENTS

| | | |
|---|---|---|
| EP | 0755052 A2 | 1/1997 |
| EP | 1475793 A1 | 11/2004 |
| GB | 1590296 | 5/1981 |
| JP | 53-46019 | 4/1978 |
| JP | 59-8618 | 1/1984 |
| JP | 59-73438 | 4/1984 |
| JP | 61-101448 | 5/1986 |
| JP | 61-101450 | 5/1986 |
| JP | 63-94444 | 4/1988 |
| JP | 2-215587 | 8/1990 |
| JP | 4-86283 | 3/1992 |
| JP | 5-198011 | 8/1993 |
| JP | 10-92027 | 4/1998 |
| JP | 11-263070 | 9/1999 |
| JP | 2003-48375 | 2/2003 |
| JP | 2003-200663 | 7/2003 |
| JP | 2003-203383 | 7/2003 |
| JP | 2003-266936 | 9/2003 |
| JP | 2005-108396 | 4/2005 |
| TW | 340864 | 9/1998 |
| TW | 574171 | 2/2004 |

OTHER PUBLICATIONS

Noboru Sasa et al., "Write-Once Disk with BiFeO Thin Films for Multilevel Optical Recording", *Japanese Journal of Applied Physics*, vol. 43, No. 7B, 2004, pp. 4972-4973.

Noboru Sasa et al., "Write-Once Disk with BiFeO Thin Film for Multilevel Optical Recording", *Japanese Journal of Applied Physics*, vol. 44, No. 5B, 2005, pp. 3643-3644.

Taiwanese official action (and English translation thereof) in connection with a counterpart Taiwanese patent application No. 94144525.

\* cited by examiner

Substrate / UL (n=2.2) / Recording Layer (10 nm) / OL / Ag Reflective Layer

Substrate / UL (n=2.4) / Recording Layer (10 nm) / OL / Ag Reflective Layer

WRITE-ONCE-READ-MANY OPTICAL RECORDING MEDIUM

TECHNICAL FIELD

This invention relates to a write-once-read-many (WORM) optical recording medium, or more specifically, a write-once-read-many optical recording medium which permits high-density recording in a blue laser beam wavelength region.

BACKGROUND ART

Presently, researches are underway regarding a write-once-read-many optical recording medium which permits recording at wavelengths of a blue laser or shorter.

Regarding the existing write-once-read-many optical recording medium, information pits are formed by applying a laser beam to a recording layer comprising an organic dye to cause an alteration in the refractive index mainly due to the decomposition or alteration of the organic material. Therefore, the optical constants and the decomposition behavior of the organic dye used for the recording layer are important factors to form preferable recording pits.

Hence, in order to achieve a write-once-read-many optical recording medium compliant with a blue laser beam, it is necessary to select a material that has appropriate optical properties and decomposition behavior at blue laser wavelengths as an organic material used for the recording layer.

However, no organic materials that comprises a high-to-low (i.e. the reflectivity at a recording mark is lower than that at a non-recording portion) recording polarity in the region of blue laser wavelengths and is able to offer favorable optical properties at blue laser wavelengths have been put into practical use.

The molecular skeleton must be downsized or the conjugate system must be shortened in order to produce an organic material having absorption band in the vicinity of blue laser wavelengths in order to obtain an organic recording medium having absorption band in the vicinity of blue laser wavelengths. However, this decreases absorption coefficient and consequently decreases the refractive index, which is followed by decreased reflectivity during non-recording period and smaller modulation.

In other words, although there exist many organic materials having an absorption band in the vicinity of blue laser wavelengths, and it is possible to control the absorption coefficients, but these materials do not have sufficiently high refractive indices. Therefore, it is difficult (but not impossible) to realize the high-to-low polarity with an organic material.

Given above, the recent trend is to make the recording polarity low-to-high in order to use an organic material for a write-once-read-many optical recording medium compliant with a blue laser beam.

However, it is undeniable that the recording polarity is preferably high-to-low since, in terms of recording apparatus, adoption of low-to-high recording polarity loses the compatibility with a read-only optical recording medium (ROM) and other conventional optical recording media.

On the other hand, a technology that adopts a recording layer with an inorganic material has been proposed, for example in Patent Literatures 1 to 2, as a write-once-read-many optical recording medium that is compliant with a blue laser beam whose recording polarity is high-to-low in Also, the usability of a recording layer comprising an oxide of a metal or a semi-metal, especially an oxide of bismuth, as a main component is proposed in Nonpatent Literatures 1 to 2.

In addition, similarly to these conventional technologies, the following technologies have been disclosed regarding materials comprising bismuth or an oxide of bismuth.

For example, Patent Literature 3 proposes a technology regarding an amorphous ferromagnetic oxide with a general formula $A_x(M_mO_n)_y(Fe_2-O_3)_z$, where A as an oxide, M as an element and x, y and z as fractions are defined. Also, Patent Literature 4 proposes a metal oxide comprising 50% or more of an amorphous phase with an oxide $M_mO_n$ and predefined fractions x, y and z, with respect to the general formula $A_x(M_mO_n)_y(Fe_2O_3)_z$, and a manufacturing method thereof. Patent Literature 5 proposes the range of composition x regarding an amorphous compound comprising a formula of $(B_2O_3)_x(Bi_2O_3)_{1-x}$ and a quenching method thereof. In addition, Patent Literature 6 discloses a technology relating to a bismuth-iron amorphous compound material comprising a composition of $(Bi_2O_3)_{1-x}(Fe_2O_3)_x$ (where $0.90 \geq x > 0$). These are all related to a transparent, ferromagnetic amorphous oxide material, which is applied for a magnetooptical recording medium, a function element that magnetically controls a light, a magnetooptical sensor, a transparent conductive film and a piezoelectric film. Furthermore, the conventional technologies described in Patent Literatures 3 to 6 are anchored by patents relating to materials and manufacturing methods, and these literatures do not mention an applicability to a write-once-read-many optical recording medium.

Patent Literature 1 Japanese Patent Application Laid-Open (JP-A) No. 2003-200663
Patent Literature 2 JP-A No. 2003-203383
Patent Literature 3 JP-A No. S61-101450
Patent Literature 4 JP-A No. S61-101448
Patent Literature 5 JP-A No. S59-8618
Patent Literature 6 JP-A No. S59-73438
Nonpatent Literature 1 Write-Once Disk with BiFeO Thin Films for Multilevel Optical Recording, JJAP, Vol. 43, No. 7B, 2004, pp. 4972
Nonpatent Literature 2 Write-Once Disk with BiFeO Thin Films for Multilevel Optical Recording, JJAP, Vol. 44, No. 5B, 2005, pp. 3643-3644

SUMMARY

The object of the present invention is to provide In an aspect of this disclosure, there is provided a write-once-read-many optical recording medium comprising a recording layer with bismuth and/or an oxide of bismuth as a main component, high-to-low recording polarity at a recording/reproducing wavelength of a blue-laser beam or shorter, and superior recording/reproducing characteristics.

The disclosure includes various other additional aspects, such as the following

<1> A write-once-read-many optical recording medium comprising a substrate, a recording layer comprising any one of bismuth and an oxide of bismuth, an overcoat layer and a reflective layer in this order from a laser beam incident plane, wherein the write-once-read-many optical recording medium has a reflectivity of 35% or less when a laser is applied to the flat part of the substrate.

<2> A write-once-read-many optical recording medium according to <1>, wherein the recording layer has a thickness of 3 nm to 20 nm, and the overcoat layer has a thickness of 5 nm to 60 nm.

<3> A write-once-read-many optical recording medium according to <1>, wherein the recording layer has a thickness of 3 nm to 20 nm, and the overcoat layer has a thickness of 70 nm to 150 nm.

<4> A write-once-read-many optical recording medium comprising a substrate, an undercoat layer, a recording layer comprising any one of bismuth and an oxide of bismuth, an overcoat layer and a reflective layer in this order from a laser beam incident plane, wherein the write-once-read-many optical recording medium has a reflectivity of 35% or less when a laser is applied to the flat part of the substrate.

<5> The write-once-read-many optical recording medium according to <4>, wherein the write-once-read-many optical recording medium satisfies the following conditions (i) to (iii):

(i) The undercoat layer has a thickness of 10 nm to 150 nm.
(ii) The recording layer has a thickness of 3 nm to 20 nm.
(ii) The overcoat layer has a thickness of 5 nm to 60 nm.

<6> The write-once-read-many optical recording medium according to <4>, wherein the write-once-read-many optical recording medium satisfies the following conditions (i) to (ii) and (iv):

(i) The undercoat layer has a thickness of 10 nm to 150 nm.
(ii) The recording layer has a thickness of 3 nm to 20 nm.
(iv) The overcoat layer has a thickness of 70 nm to 150 nm.

<7> The write-once-read-many optical recording medium according to any one of <4> to <6>, wherein the undercoat layer comprises any one of an oxide and a nitride.

<8> The write-once-read-many optical recording medium according to <7>, wherein at least any one of the oxide and the nitride is a compound selected from $Al_2O_3$, AlN, SiN and ZrN.

<9> The write-once-read-many optical recording medium according to any one of <1> to <8>, wherein at least any one of the overcoat layer and undercoat layer comprises a sulfide, and the sulfide is at least any one compound selected from AgS, AlS, BS, BaS, BiS, CaS, CdS, CoS, CrS, CuS, FeS, GeS, InS, KS, LiS, MgS, MnS, MoS, NaS, NbS, NiS, PbS, SbS, SnS, SrS, WS and ZnS.

<10> The write-once-read-many optical recording medium according to any one of <1> to <8>, wherein at least any one of the overcoat layer and undercoat layer comprises $ZnS-SiO_2$, and the mixing ratio of ZnS to $SiO_2$ is 70/30 to 90/10 on a molar basis.

<11> The write-once-read-many optical recording medium according to any one of <1> to <10>, wherein the reflective layer comprises any one of silver and aluminum.

<12> The write-once-read-many optical recording medium according to any one of <1> to <11>, wherein the recording layer comprises any one element selected from µl, Cr, Mn, Sc, In, Ru, Rh, Co, Fe, Cu, Ni, Zn, Li, Si, Ge, Zr, Ti, Hf, Sn, Pb, Mo, V and Nb.

<13> The write-once-read-many optical recording medium according to any one of <1> to <12>, wherein a recording mark which generates three or more different types of reproducing signal levels is formed and the types of a recording mark is determined based on the reproducing signal levels.

In another aspect of this disclosure, there is provided a write-once-read-many optical recording medium of the present invention comprises, in the first configuration, a substrate, a recording layer comprising any one of bismuth and an oxide of bismuth, an overcoat layer and a reflective layer in this order from the incident plane of a laser beam, wherein the write-once-read-many optical recording medium has a reflectivity of 35% or less when a laser is applied to the flat part of the substrate.

In another aspect, a write-once-read-many optical recording medium comprises a substrate, an undercoat layer, a recording layer comprising any one of bismuth and an oxide of bismuth, an overcoat layer and a reflective layer in this order from the incident plane of a laser beam, wherein the write-once-read-many optical recording medium has a reflectivity of 35% or less when a laser is applied to the flat part of the substrate.

The aforementioned write-once-read-many optical recording media provide a layer composition (i.e. the combination of materials, and thicknesses) that maximizes excellent properties of the recording media comprising bismuth and/or an oxide of bismuth as a main component.

According to the various aspects, features and embodiments of this disclosure, the following properties may be achieved:

(1) a high-density write-once-read-many optical recording medium which easily permits binary recording/reproducing even in a blue-laser wavelength region of 500 nm or less, particularly at a wavelength near 405 nm (2) a high-density write-once-read-many optical recording medium which permits multi-level recording/reproducing even in a blue laser wavelength region of 500 nm or less, particularly at a wavelength near 405 nm (3) a high-density write-once-read-many optical recording medium which is suitable for recording/reproducing by a Partial Response Maximum Likelihood (PRML) signal processing system even in a blue laser wavelength region of 500 nm or less, particularly at a wavelength near 405 nm (4) a write-once-read-many optical recording medium having wide margins in jitter, error rate and other properties with respect to a variation in recording power (5) a write-once-read-many optical recording medium exhibiting less variation in recording properties such as recording sensitivity, modulation, jitter and error rate and in reflectivity with respect to a variation in recording/reproducing wavelength (6) a write-once-read-many optical recording medium allowing easy recording/reproducing even with a substrate having shallow grooves and good transfer property (7) a write-once-read-many optical recording medium which permits recording even in its lands

BEST MODE FOR CARRYING OUT THE INVENTION

Figure 1:
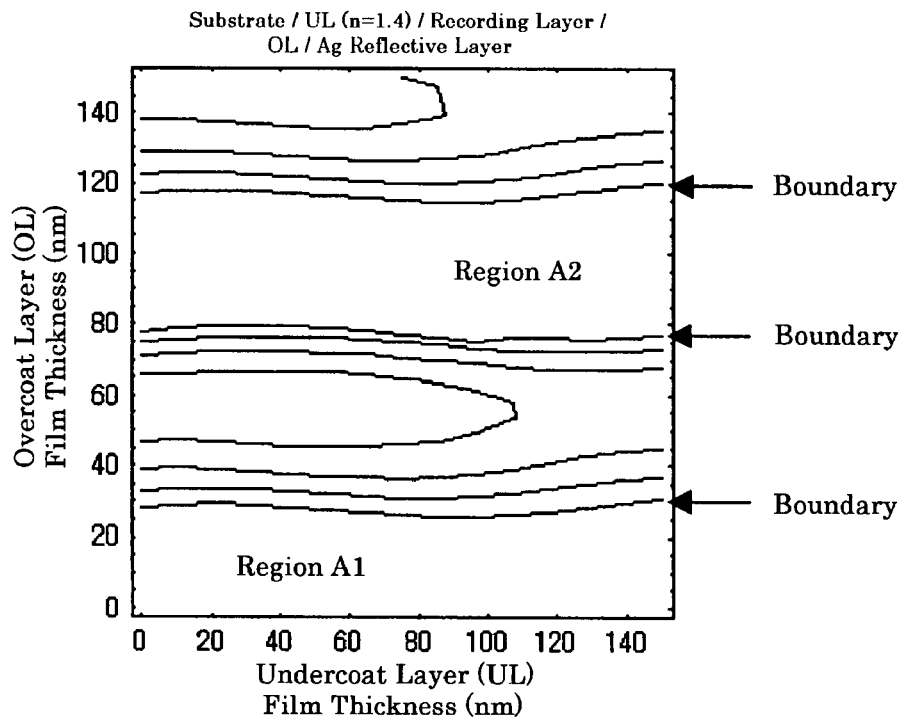
FIG. 1 is a diagram showing the result of a study to determine the optimal range of thickness of an overcoat layer and an undercoat layer.

A write-once-read-many optical recording medium of the present invention comprises, in the first configuration, a substrate, a recording layer comprising any one of bismuth and an oxide of bismuth, an overcoat layer and a reflective layer in this order from the incident plane of a laser beam, and the write-once-read-many optical recording medium has a reflectivity of 35% or less when a laser is applied to the flat part of the substrate.

A write-once-read-many optical recording medium of the present invention comprises, in the second configuration, a substrate, an undercoat layer, a recording layer comprising any one of bismuth and an oxide of bismuth, an overcoat layer and a reflective layer in this order from the incident plane of a laser beam, and the write-once-read-many optical recording medium has a reflectivity of 35% or less when a laser is applied to the flat part of the substrate.

Hereinafter, the present invention will be illustrated in more detail with reference to figures, but these are not to be construed as limiting the present invention.

The layer composition of a write-once-read-many optical recording medium is characterized by the following (A) and (B):

(A) A recording layer comprising bismuth and or an oxide of bismuth as a main component is employed.

(B) Preferably, a layer comprising a sulfide is installed adjacent to the recording layer.

First, the reason for (A), employing the recording layer comprising bismuth and/or an oxide of bismuth as a main component, is described.

A recording layer comprising bismuth and/or an oxide of bismuth as a main component such as $Bi_2O_3$, $Bi+Bi_2O_3$, $Bi_3Fe_5O_{12}$, $Bi+Bi_3Fe_5O_x$ exhibits superior recording/reproducing properties as stated in documents such as aforementioned literatures 'Write-Once Disk with BiFeO Thin Films for Multilevel Optical Recording, JJAP, Vol. 43, No. 7B, 2004, pp. 4972' and 'Write-Once Disk with BiFeO Thin Films for Multilevel Optical Recording, JJAP, Vol. 44, No. 5B, 2005, pp. 3643-3644.'

This is because the recording layer forms a very fine microcrystallographic group by the application of a laser beam; this is referable to the microcrystal sufficiently smaller than the size of the recording/reproducing laser beam (i.e. beam spot).

Preferable recording/reproducing properties may be achieved since the formation of the microcrystal suppresses the expansion and distortion of a recording mark (the bleeding and distortion of a recording mark tend to grow when the recording mark is formed by successive physical changes, chemical changes or geometric changes). The detailed mechanism of the microcrystal formation is still under analysis; however, it is considered the microcrystal formation is triggered by the following phenomena:

The bismuth in the recording layer is crystallized.

The bismuth oxide (BiO) in the recording layer is crystallized.

The oxide of bismuth such as BiFeO is crystallized (in the present invention, there is a clear distinction between bismuth oxide and oxide of bismuth. An oxide of bismuth is a collective term of a compound comprising an oxide of bismuth while bismuth oxide indicates BiO, which is one of oxides of bismuth).

The bismuth in the recording layer and the sulfur in the adjacent layer react and crystallize.

The bismuth, bismuth oxide or oxide of bismuth causes phase separation such as binodal decomposition and spinodal decomposition.

Here, the description 'a recording layer comprising bismuth or an oxide of bismuth as a main component' implies that the bismuth and/or the oxide of bismuth is comprised in a proportion sufficient to function as a recording layer of the present invention (approximately 50% by mass or greater); however, a recording layer usually consists only of bismuth and/or an oxide of bismuth excluding other elements and compounds mixed as impurities. For example, the above-mentioned recording layer is composed of the following materials:

metallic bismuth+oxide of bismuth metallic bismuth+oxide of bismuth+other elements or compounds oxide of bismuth oxide of bismuth+other elements or compounds The recording layer composed only of metallic bismuth is excluded from this invention. This is because melting becomes predominant for the recording layer, and micro-crystallization does not easily occur. Also, a sufficient proportion of metallic bismuth that may cause micro-crystallization is approximately 50% by mass or less.

The complex refractive index of the recording layer shows normal dispersion since the recording layer comprises bismuth and/or an oxide of bismuth as a main component (on the other hand for an organic material, there exists a wavelength region where the complex refractive index shows abnormal dispersion, and the wavelength region is used as a recording/reproducing wavelength). The complex refractive index has little wavelength dependence since the material of the present invention, unlike an organic material, does not comprise large absorption band in a particular wavelength range. Therefore, it is able to resolve considerably the problems of a conventional write-once-read-many optical recording medium that the variation in the recording/reproducing wavelength due to individual differences between laser beams and the change in environmental temperature greatly affect the recording properties such as recording sensitivity, modulation, jitter and error rate, and reflectivity.

Regarding the heretofore known write-once-read-many optical recording medium, an organic thin film serves both as a recording layer and a light absorption layer, and it is a prerequisite of the organic material to have a large refractive index n and a relatively small absorption coefficient k. In order for the medium to reach the temperature at which the organic material decomposes, it is considered necessary that the film has a relatively large thickness. Therefore, it has been necessary that grooves in the substrate of the conventional write-once-read-many optical recording medium with a recording layer comprising an organic material must have a significant depth, and the film is thickened by embedding pigments in the grooves of the substrate, for example.

Correspondingly, by employing a recording layer of the present invention, it is possible to use a substrate with shallower grooves which has superior transfer property (formability). This type of substrate may be easily manufactured (formed) at a lower cost compared to conventional equivalents, and the resulting optical recording medium has significantly improved signal quality.

Next, the following explains the reason for defining in the present invention the reflectivity as a write-once-read-many optical recording medium.

Today, standards as a write-once-read-many optical recording medium employing a blue laser beam exist for BD-R (a write-once-read-many disc in Blu-ray standards) and HD DVD-R (a write-once-read-many disc in HD DVD standards). In order for the write-once-read-many optical recording medium comprising a recording medium of the present invention to satisfy the recording sensitivity (optimal recording power) of the standards, the reflectivity must be 35% or less when a laser is applied to the flat part of the substrate (the area where no guide grooves exist, in other words, an area where all the layers are flat). This reflectivity is hereinafter referred to as a reflectivity at a flat part.

When the reflectivity at a flat part exceeds 35%, it frequently occurs that the optimal recording power exceeds the standard value of 6 mW (1×) for BD-R and 10 mW (1×) for HD DVD-R. Therefore, it is very important for a write-once-read-many optical recording medium comprising a recording layer comprising bismuth and/or an oxide of bismuth as a main component to set the thickness such that the reflectivity of a flat part is 35% or less.

Next, the reason for which a layer comprising a sulfide is preferably installed adjacent to the recording layer is stated below.

The recording principle of the recording layer of the present invention is, as stated above, micro-crystallization. It has been found that the installation of a layer comprising a sulfide as an adjacent layer promotes the micro-crystallization and that the medium exhibits superior recording/reproducing properties.

The following mechanism is currently presumed as the reason for the improved recording/reproducing properties with the addition of sulfur atom to the adjacent layers, which is an undercoat layer and an overcoat layer in the present invention:

bismuth reacts with sulfur, and crystallization occurs
the sulfur compound crystallizes due to the heat generated in the recording layer.
bismuth promotes the crystallization of the sulfur compound.
sulfur promotes crystallization of bismuth or a oxide of bismuth.
the sulfur compounds, with relatively low degree of hardness, promotes the crystallization of the recording layer (it is able to accept the change in the volume due to crystallization).
the sulfur compound comprises relatively high heat conductivity, which creates a quenching condition and hence promotes the crystallization.
the temperature of the recording layer may be raised with a laser beam of lower intensity since there are cases where the sulfur compounds comprise relatively large absorption coefficient (imaginary part of the complex refractive index) compared to oxides.

Here, the composition of the sulfide in an adjacent layer is preferably 50% by mole or greater for the improved productivity (improved speed of film deposition), appropriate film hardness and appropriate complex refractive index.

In the present invention, a layer comprising sulfide, which indicates an overcoat layer or an undercoat layer, is installed as an adjacent layer of the recording layer to significantly improve the recording/reproducing properties. It is possible only the overcoat layer comprises a sulfide, only the undercoat layer comprises a sulfide, or that both the overcoat layer and the undercoat layer comprise sulfides.

The present invention provides, as a preferable composition of a write-once-read-many optical recording medium, a write-once-read-many optical recording medium without an undercoat layer (for example a medium with a substrate, a recording layer, an overcoat layer and a reflective layer). In this case, the overcoat layer preferably comprises a sulfide as a main component. A configuration in which only the undercoat layer comprises a sulfide as a main component is preferable. A configuration in which only the overcoat layer comprises a sulfide as a main component and a configuration in which both the overcoat layer and the undercoat layer comprise sulfides as a main component are more preferable.

Examples of a preferable sulfide includes AgS, AlS, BS, BaS, BiS, CaS, CdS, CoS, CrS, CuS, FeS, GeS, InS, KS, LiS, MgS, MnS, MoS, NaS, NbS, NiS, PbS, SbS, SnS, SrS, WS and ZnS.

However, it is not mandatory for the overcoat layer and/or undercoat layer to comprise a sulfide; instead, an oxide, a nitride, a fluoride and a carbonate may be used individually or in combination.

Examples of a material for the overcoat layer other than sulfide include $Al_2O_3$, $SiO_2$ and $MgF_2$, and examples of a material for the undercoat layer other than sulfide include $Al_2O_3$, AlN, SiN and ZrN. $Al_2O_3$, AlN, SiN and ZrN are in general materials with higher heat conductivity although it depends on the film quality and the amount of impurities. These are valid materials that create a quenching condition during the formation of a recording mark with respect to the micro-crystallization of the recording layer material, which is the recording principle of the present invention.

Furthermore, the following explains the reason for defining the preferable ranges of thicknesses for the layers in the present invention.

First, a recording layer of the present invention comprising bismuth and/or an oxide of bismuth as a main component has a complex refractive index with the real part of about 2.3 to 3.0 and the imaginary part of about 0.3 to 0.8.

An ordinary write-once-read-many optical recording medium generally comprises a reflective layer for high reflectivity as well as favorable recording/reproducing properties, and the reflective layer is installed over a recording layer through an overcoat layer (it is not preferable to install a reflective layer directly over a recording layer since the most preferable thickness of a recording layer comprising an inorganic material is significantly smaller than that of a recording layer comprising an organic material). Therefore, the overcoat layer is a mandatory layer for the write-once-read-many optical recording medium of the present invention.

In the case of the write-once-read-many optical recording medium comprising this reflective layer, the most preferable thickness of the recording layer comprising bismuth and/or an oxide of bismuth as a main component is 3 nm to 20 nm. The recording layer with a thickness of less than 3 nm has the significantly impaired recording sensitivity as well as insufficient modulation. There is a tendency that the recording layer with a thickness exceeding 20 nm also has an impaired recording sensitivity. In addition, there are cases with the recording layer having a thickness exceeding 20 nm that the qualities of wobble signal and push-pull signal drop although depending on the shape of the grooves in the substrate.

In the present invention, the range of the most preferable thicknesses for an overcoat layer and an undercoat layer for favorable recording/reproducing properties and reliability was examined while the most preferable thickness of a recording layer comprising bismuth and/or an oxide of bismuth as a main component is set at 3 nm to 20 nm.

The inventors determined that the recording sensitivity was the most critical term for a write-once-read-many optical recording medium, and they studied the most preferable range of thicknesses for an overcoat layer and an undercoat layer that satisfy the recording sensitivity of standards, i.e. the most preferable range of thicknesses for the overcoat layer and an undercoat layer such that the reflectivity at flat part is basically 35% or less. Here, the selection of the materials for the overcoat layer and the undercoat layer is discretionary. ZnS—SiO$_2$ may be preferably used for any one of the overcoat layer and the undercoat layer of the present invention since ZnS—SiO$_2$ is an excellent material in terms of deposition speed, ease of preparing a sputtering target and stability. As mentioned hereinafter, the undercoat layer assumes a role to protect the recording layer from oxygen and moisture comprised in or permeating through the substrate; therefore, the undercoat layer generally has a narrow choice of materials compared to the overcoat layer. As stated above, at least the overcoat layer comprises ZnS—SiO$_2$ as a main component, considering the selection of materials, the manufacturing cost and the recording principle of the present invention. Here, the main component implies that the composition is 50% by mole or greater.

Given above, the examination results of the most preferable thickness for the overcoat layer and the undercoat layer are shown in FIGS. 1 to 12 for the case of the overcoat layer comprising ZnS—SiO$_2$ as a main component (including the case where the overcoat layer mainly comprising other materials exhibits the same complex refractive index as that mainly comprising ZnS—SiO$_2$.

Here, FIGS. 1 to 12 are the calculated results of the reflectivity at a flat part with varying thicknesses of the undercoat layer (denoted as UL film thickness in FIGs.) and the overcoat layer (denoted as OL film thickness in FIGs) while the complex refractive index of the recording layer of the present invention is fixed at 2.8-i0.56, the thickness of the recording layer is fixed at 10 nm, and the complex refractive index of the overcoat layer is fixed at 2.3-i0.01.

Figure 4:
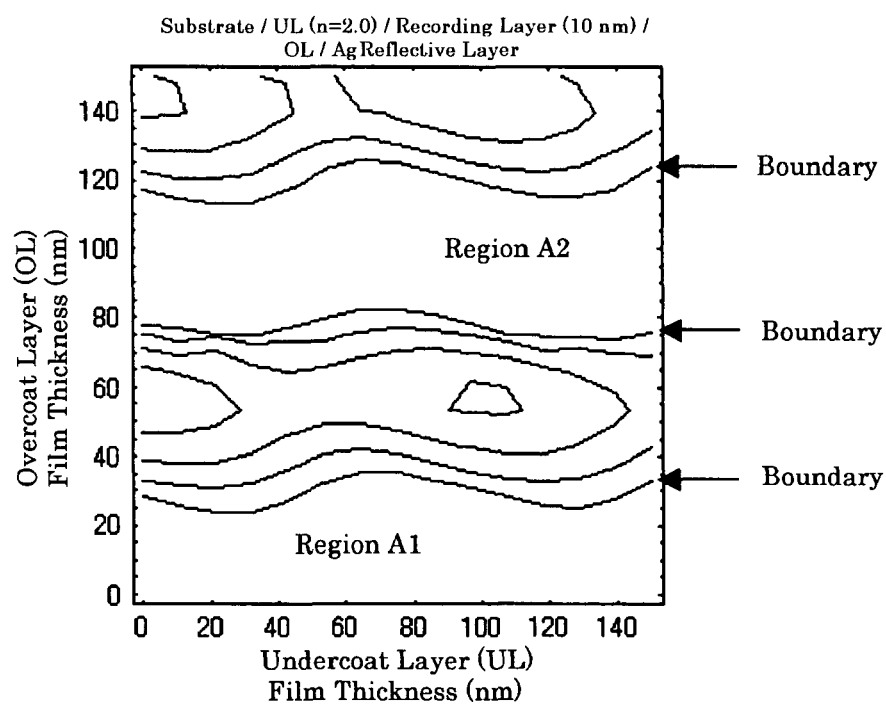
FIG. 4 is a diagram showing the result of a study to determine the optimal range of thickness of an overcoat layer and an undercoat layer.
Figure 5:
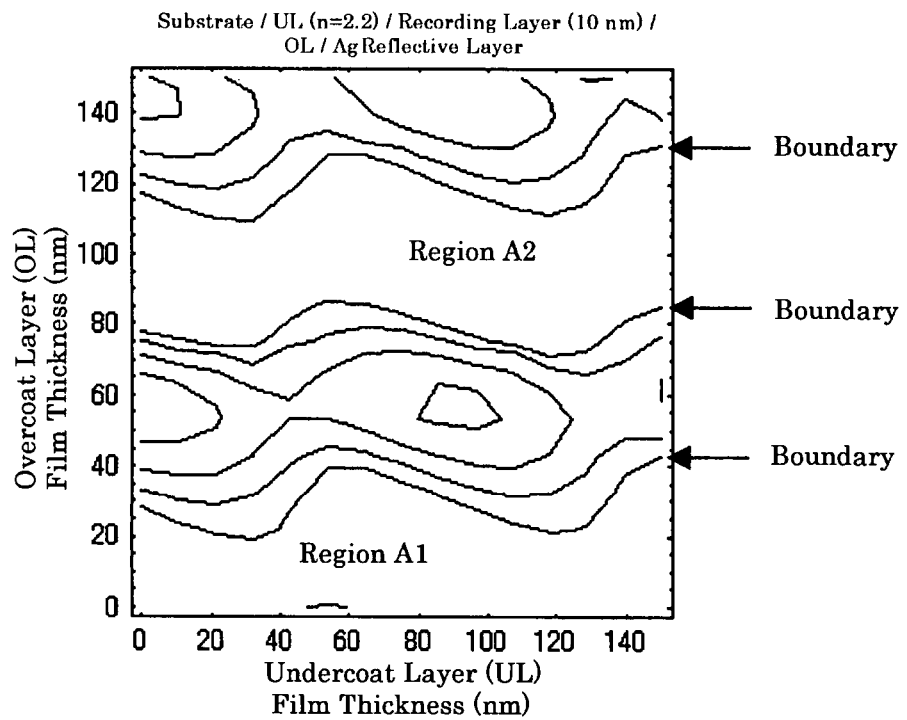
FIG. 5 is a diagram showing the result of a study to determine the optimal range of thickness of an overcoat layer and an undercoat layer.
Figure 6:
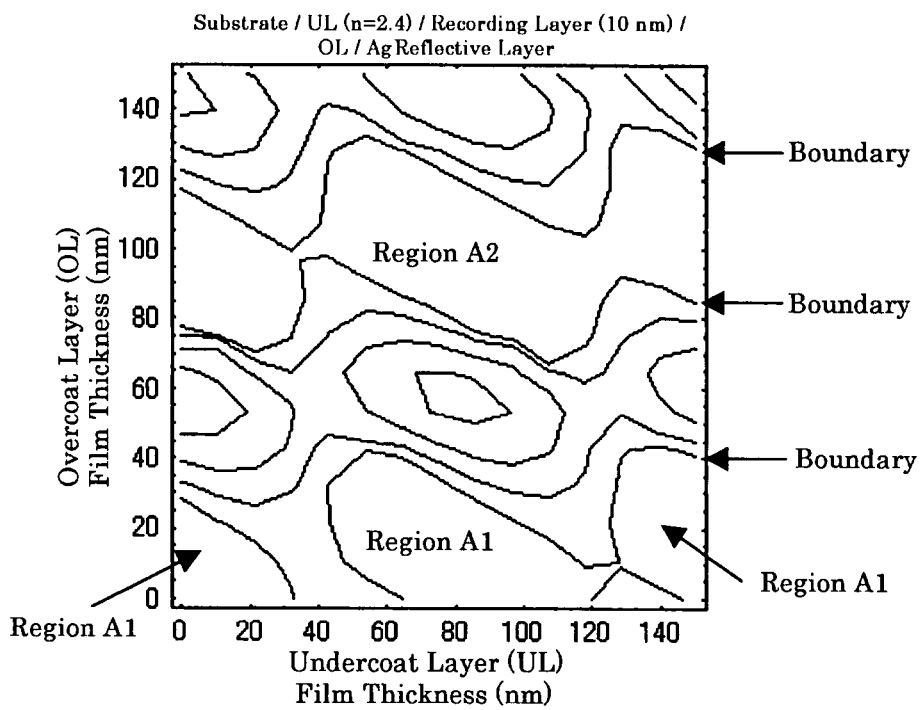
FIG. 6 is a diagram showing the result of a study to determine the optimal range of thickness of an overcoat layer and an undercoat layer.

FIGS. 1 to 6 are the calculated results with the reflective layer comprising an Ag material, whose complex refractive index is considered equal to that of pure Ag, and the complex refractive index of the undercoat layer was varied as follows: 1.4-i0.01 (FIG. 1), 1.6-i0.01 (FIG. 2), 1.8-i0.01 (FIG. 3), 2.0-i0.01 (FIG. 4), 2.2-i0.01 (FIG. 5) and 2.4-i0.01 (FIG. 6).

Figure 10:
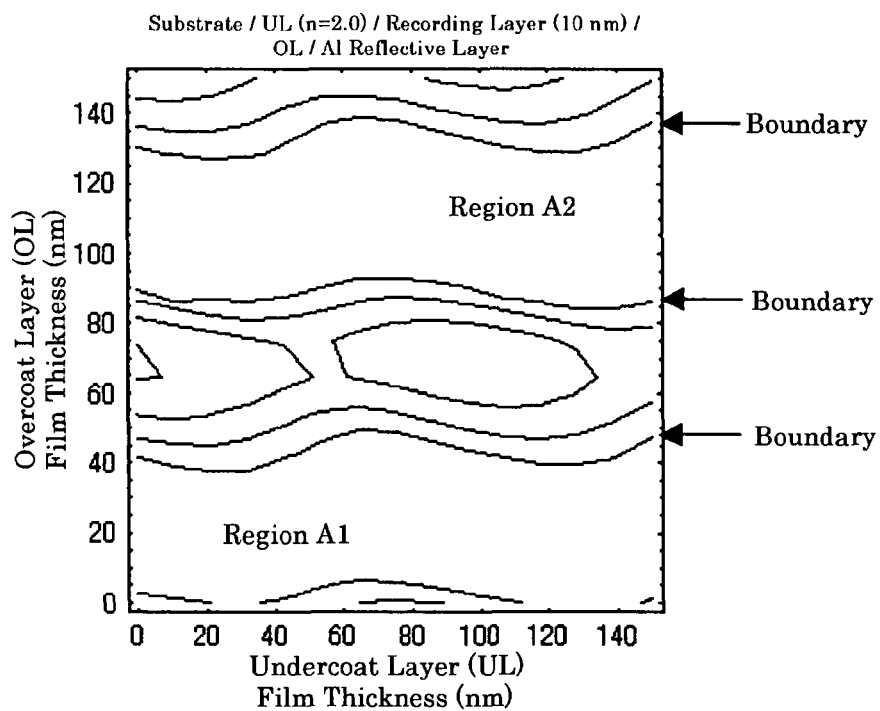
FIG. 10 is a diagram showing the result of a study to determine the optimal range of thickness of an overcoat layer and an undercoat layer.
Figure 11:
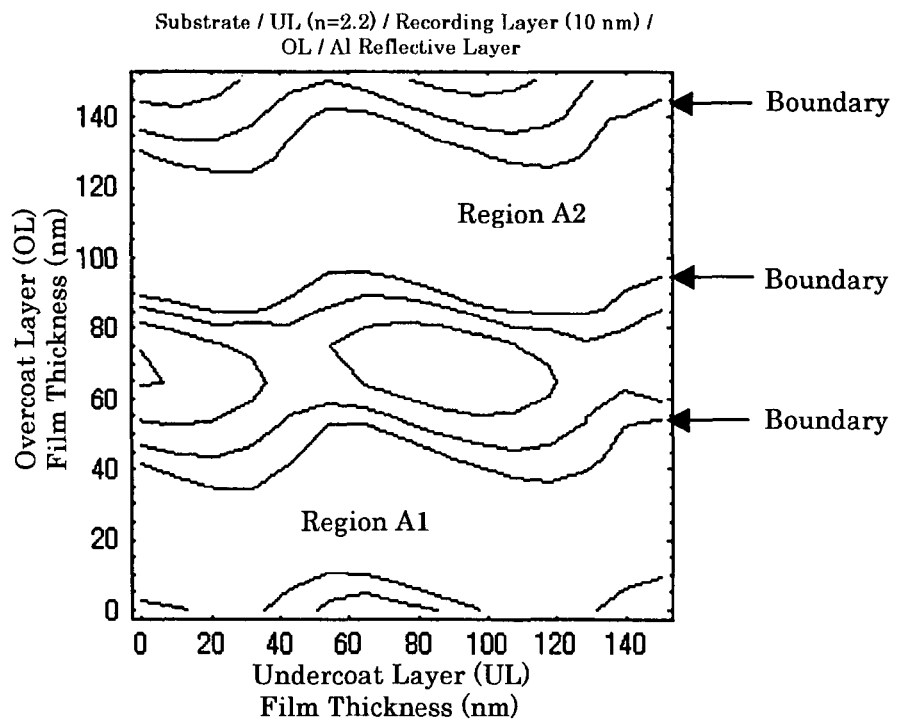
FIG. 11 is a diagram showing the result of a study to determine the optimal range of thickness of an overcoat layer and an undercoat layer.
Figure 12:
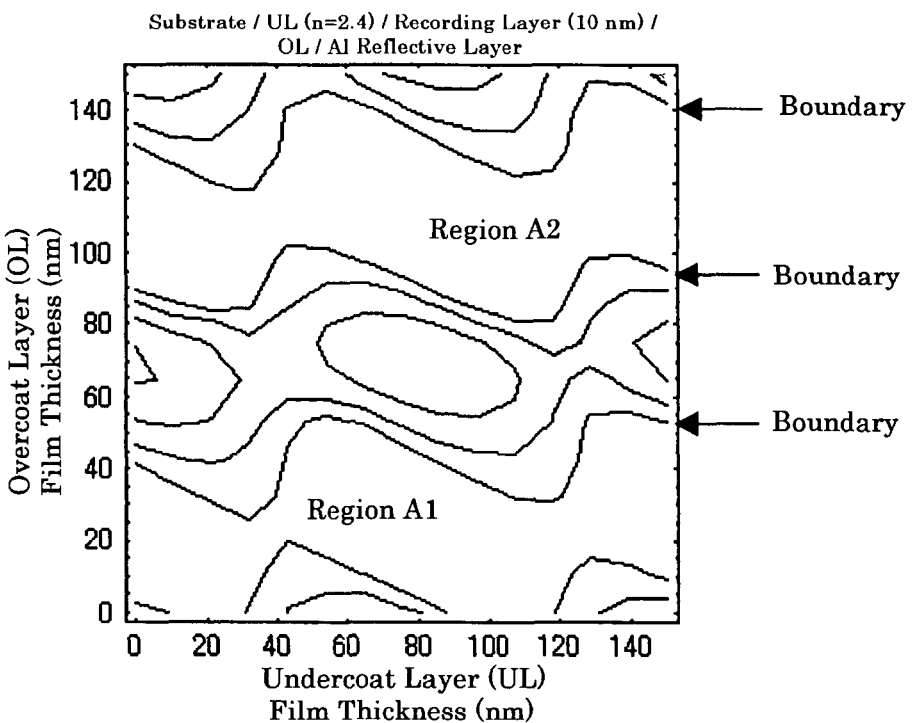
FIG. 12 is a diagram showing the result of a study to determine the optimal range of thickness of an overcoat layer and an undercoat layer.

FIGS. 7 to 12 are the calculated results with the reflective layer comprising an Al material, whose complex refractive index is considered equal to that of pure Al, and the complex refractive index of the undercoat layer was varied as follows: 1.4-i0.01 (FIG. 7), 1.6-i0.01 (FIG. 8), 1.8-i0.01 (FIG. 9), 2.0-i0.01 (FIG. 10), 2.2-i0.01 (FIG. 11) and 2.4-i0.01 (FIG. 12).

In FIGS. 1 to 12, the region where the reflectivity at a flat part is 35% or less is denoted as "Region A1" and "Region A2" with arrows on the right side of the figures indicating the border line of the reflectivity.

Here, the upper limit of the thicknesses for the undercoat layer and the overcoat layer was set at 150 nm in consideration of productivity (i.e. cost). However, this does not mean that an overcoat layer and an undercoat layer having thicknesses exceeding 150 nm impair the recording/reproducing properties of the write-once-read-many optical recording medium of the present invention.

The calculation results indicate that the reflectivity of the write-once-read-many optical recording medium of the present invention, i.e. the recording sensitivity, depends heavily on the thickness of the overcoat layer. On the other hand, the sensitivity of the write-once-read-many optical recording medium of the present invention, i.e. the recording sensitivity, is less dependent on the thickness of the undercoat layer compared to the thickness of the overcoat layer.

When the material is fixed for the overcoat layer (i.e. the complex refractive index of the overcoat layer is fixed), the reflectivity at a flat part gradually shows dependence on the thickness of the undercoat layer as the real part of the complex refractive index of the undercoat layer increases. However, there are two thickness regions of the overcoat layer (Region A1 and Region A2) since the region with the reflectivity at a flat part of 35% or less is determined mainly by the thickness of the overcoat layer.

Region A1 is a region with a thin overcoat layer where excellent recording/reproducing properties may be achieved. On the other hand, Region A2 is a region with a thick overcoat layer where the recording sensitivity may be significantly improved since the insulation effect improves with the increased distance between the recording layer and the reflective layer.

Table 1 shows the range of thickness in Region A1 and Region A2 based on the results of FIGS. 1 to 12, where the lower and upper limits of the thickness range are the smallest thickness and the largest thickness that satisfy the reflectivity at a flat part of 35% or less. Table 1 indicates that the thickness range of the overcoat layer in Region 1 exists at 0 nm to 60 nm, and that the thickness range of the overcoat layer in Region 2 exists at 70 nm to 150 nm.

TABLE 1

Figure 2:
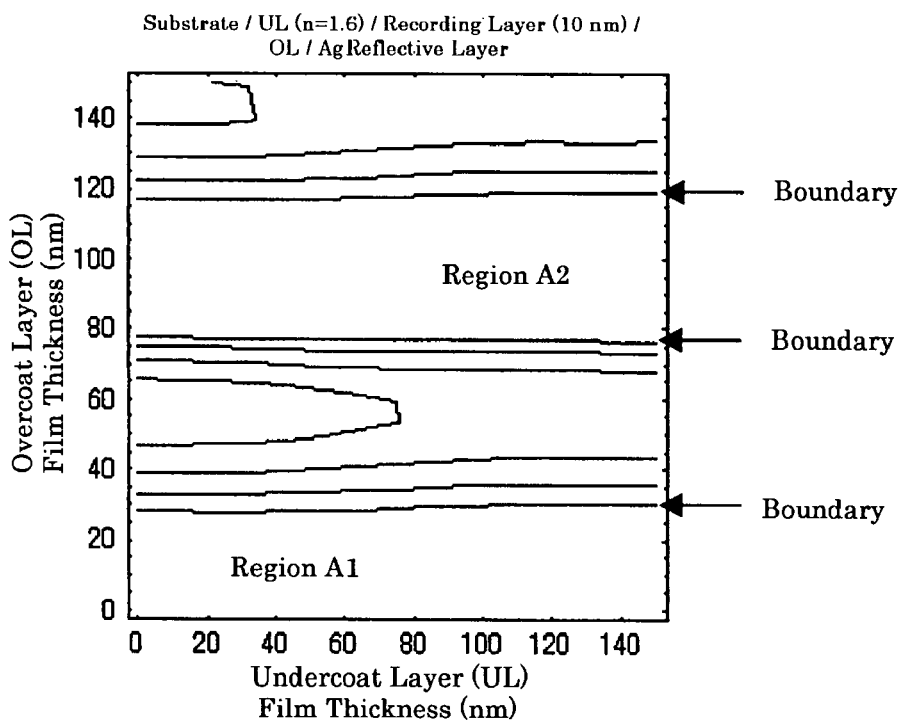
FIG. 2 is a diagram showing the result of a study to determine the optimal range of thickness of an overcoat layer and an undercoat layer.
Figure 3:
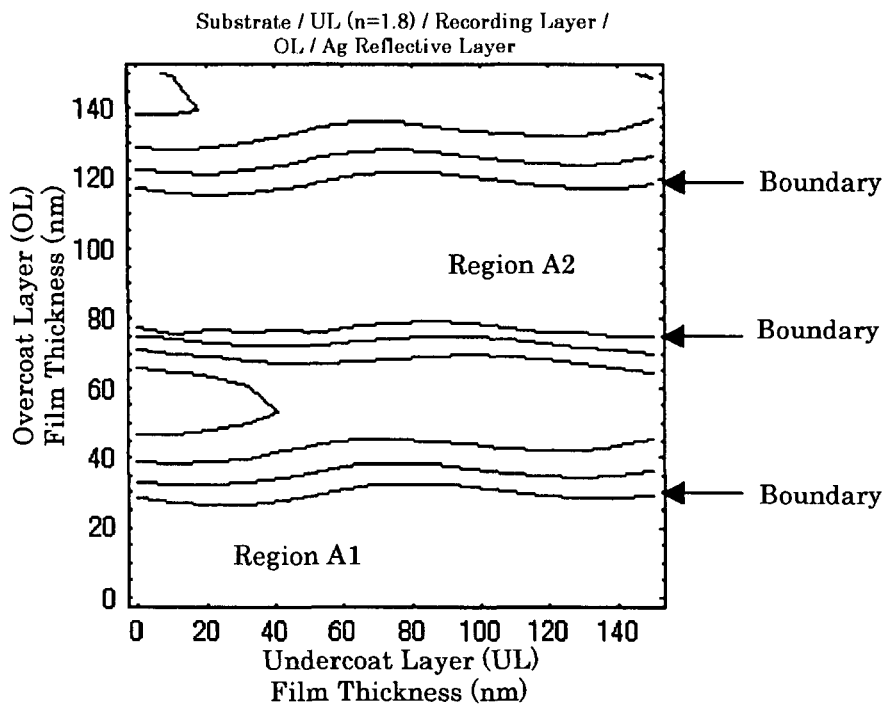
FIG. 3 is a diagram showing the result of a study to determine the optimal range of thickness of an overcoat layer and an undercoat layer.
Figure 7:
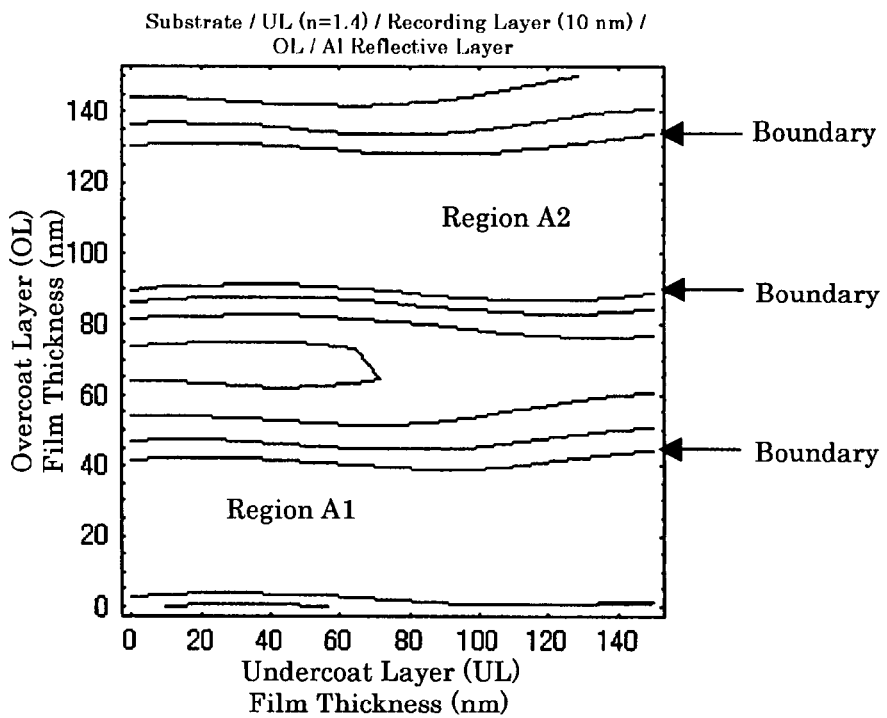
FIG. 7 is a diagram showing the result of a study to determine the optimal range of thickness of an overcoat layer and an undercoat layer.
Figure 8:
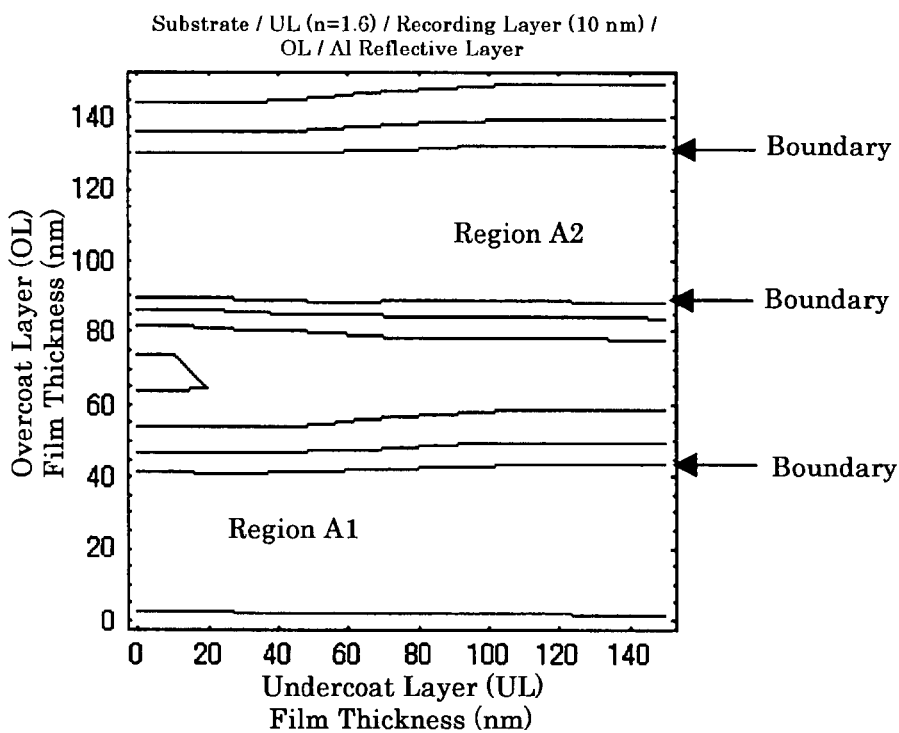
FIG. 8 is a diagram showing the result of a study to determine the optimal range of thickness of an overcoat layer and an undercoat layer.
Figure 9:
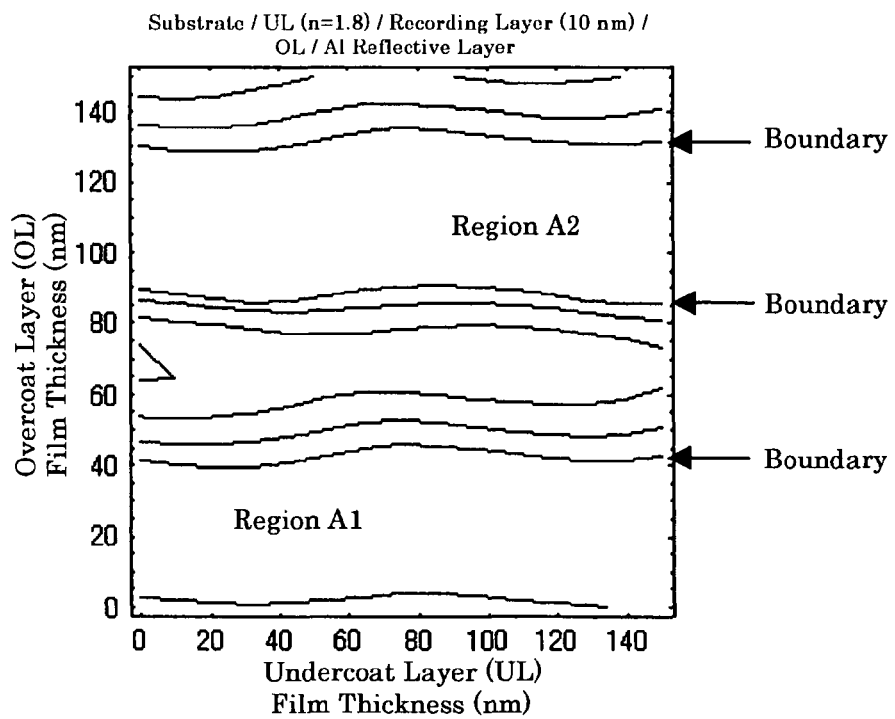
FIG. 9 is a diagram showing the result of a study to determine the optimal range of thickness of an overcoat layer and an undercoat layer.

|  | Range of Region A1 (nm) | Range of Region A2 (nm) |
| --- | --- | --- |
| FIG. 1 | 0-30 | 75-120 |
| FIG. 2 | 0-30 | 75-120 |
| FIG. 3 | 0-35 | 75-125 |
| FIG. 4 | 0-35 | 75-125 |
| FIG. 5 | 0-40 | 70-130 |
| FIG. 6 | 0-45 | 70-135 |
| FIG. 7 | 0-45 | 90-135 |
| FIG. 8 | 0-45 | 90-130 |
| FIG. 9 | 0-45 | 85-135 |
| FIG. 10 | 0-50 | 85-140 |
| FIG. 11 | 0-55 | 85-145 |
| FIG. 12 | 0-60 | 80-150 |

The calculated results are, as mentioned above, the reflectivity at a flat part when the complex refractive index of the recording layer of the present invention is fixed at 2.8-i0.56, the thickness of the recording layer is fixed at 10 nm, and the complex refractive index of the overcoat layer is fixed at 2.3-i0.01.

Also in the following cases, the thickness range of the overcoat layer, Region A1, exists near 0 nm to 60 nm, and the thickness range of the overcoat layer, Region A2, exists near 70 nm to 150 nm:

a) the recording layer has a complex refractive index of 2.3 to 3.0 for the real part and 0.3 to 0.8 for the imaginary part.

b) The recording layer has a thickness of 3 nm to 20 nm.

c) The overcoat layer has a complex refractive index of 1.4 to 3.0 for the real part and 0 to 0.1 for the imaginary part.

d) The undercoat layer has a complex refractive index of 1.4 to 3.0 for the real part and 0 to 0.1 for the imaginary part.

As explained above, the most preferable ranges of the overcoat layer are 0 nm to 60 nm and 70 nm to 150 nm. The recording sensitivity decreases with the thickness of the overcoat layer of less than 5 nm although there are cases where the reflectivity at a flat part is 35% or less (the region where the reflectivity at a flat part is not proportional to the sensitivity). Therefore, this region is excluded from the most preferable range of thickness of the present invention.

In other words, in the present invention, the most preferable range of thickness for the overcoat layer exists in the ranges of 5 nm to 60 nm and 70 nm to 150 nm with an overcoat layer comprising ZnS—SiO2 as a main component or with an overcoat layer comprising a material having the same complex refractive index as the material comprising ZnS—SiO2 as a main material.

However, as seen from the results in FIGS. 1 to 12, the thickness of the undercoat layer does not significantly affect the recording sensitivity of the write-once-read-many optical recording medium of the present invention compared to the thickness of the overcoat layer; therefore, the choice of the thickness of the undercoat layer is discretionary as long as it is 150 nm or less. Here, the undercoat layer effectively improves the reliability of the recording layer as well as improving the recording sensitivity, reflectivity and other recording/reproducing properties.

In general, the substrate of an optical recording medium comprises a polycarbonate in terms of cost. However, a recording layer which is deposited directly to a polycarbonate substrate tends to degrade quickly since polycarbonate has a low gas-barrier property against moisture and oxygen.

It is preferable to install an undercoat layer in order to suppress the degradation of the recording layer. The thickness of the undercoat layer is preferably 10 nm or greater to ensure the reliability of the recording layer comprising bismuth and or an oxide of bismuth as a main component although it largely depends on the material and the film quality of the undercoat layer.

For above reasons, the undercoat layer of a write-once-read-many optical recording medium of the present invention has a thickness of most preferably 10 nm to 150 nm. However, when a material with high gas-barrier property is employed for the substrate or when a gas-barrier layer is installed on the laser incident side of the substrate, the reliability of the write-once-read-many optical recording medium may be ensured without the undercoat layer (i.e. the undercoat layer has a thickness of 0 nm).

A write-once-read-many optical recording medium of the present invention is applicable to various types of write-once-read-many optical recording media since it comprises excellent recording/reproducing properties.

As a write-once-read-many optical recording medium for binary recording, it may be used, for example, for the conventional CD-R and DVD+/-R, BD-R which performs recording/reproducing by means of a blue laser beam, as well as HD DVD-R which adopts PRML.

Furthermore, it may be used as a recording medium for multi-level recording which enables a high-density recording compared to recording/reproducing systems based on binary recording and PRML.

A multi-level recording is briefly explained below.

This multi-level recording technology is, in simple terms, a technology to improve the recording linear density. In multi-level data recording on an optical recording medium (an optical recording medium that permits recording of multi-level data is called a multi-level optical recording medium), information is expressed by multi-level reflectance of the marks recorded in a recording unit (unit recording area) of a recording mark in the multi-level optical recording medium.

In a conventional CD or DVD optical recording medium, one bit is indicated by the presence or absence of a recording mark. In contrast, according to the multi-level recording, recording marks are recorded at, for example, eight different levels of sizes, the signal level (level of reflectance) varies respectively when a laser beam is irradiated to the eight types of recording marks with different sizes (in other words, the levels of reproducing signals obtained in reproducing the eight types of recording marks with different sizes), and the recording marks are read out as reflectance at eight different levels In the multi-level recording, one recording mark represents information corresponding to three bits, and the recording density in the recording region of an optical recording medium thereby may be increased.

In multi-level recording, the beam spot diameter of a reproducing laser beam is generally larger than the length of a unit recording area, which enables one recording mark to express information corresponding to three bits. Thus, the recording linear density may be increased to thereby increase the recording capacity without narrowing the track pitch.

Figure 13:
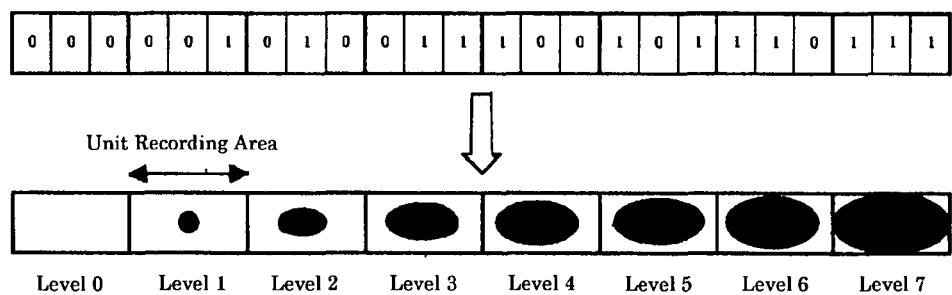
FIG. 13 is a view schematically showing a hypothetical unit recording area of an optical recording medium according to the present invention.

In general, as shown in FIG. 13, it is common to vary an area ratio of the recording marks (an area ratio in the planar direction of the optical recording medium) with respect to a hypothetical unit recording area to generate three or more different types of reproducing signal levels. According to the present invention, it is possible to generate three or more different types of reproducing signal levels by varying the size of the recording mark forming area in the cross-sectional direction of the optical recording medium aside from the area ratio. This recording method is called a multi-level recording.

While jitter is used as an index to measure the signal quality in binary recording, SDR is used as an index to measure the signal quality in multi-level recording.

Here, SDR is an index equivalent to jitter in binary recording, given by Equation (1):

$$SDR = (\sigma m_0 + \sigma m_1 + \sigma m_2 + \ldots + \sigma m_{\alpha-2} + \sigma m_{\alpha-1})/(\alpha \cdot |R_0 - R_{\alpha-1}|)$$  Equation (1)

where $R_i$ ($R_0, R_1, R_2, \ldots, R_{\alpha-2}, R_{\alpha-1}$) is a reflective level of a multi-value level $m_i$ ($m_0, m_1, m_2, \ldots, m_{\alpha-2}, m_{\alpha-1}$) of $\alpha$ types, and $\sigma m_i$ is the standard deviation of the level $R_i$ at the multi-value level $m_i$.

Other layers comprised in the write-once-read-many optical recording medium of the present invention are described below.

Regarding a substrate material, it is not restricted as long as the material comprises superior thermal and mechanical properties as well as superior light transmission properties when recording/reproducing takes place from the side of the substrate (through the substrate). Examples of the material for the substrate include polycarbonate, polymethylmethacrylate, amorphous polyolefin, cellulose acetate and polyethylene terephthalate. Among them, polycarbonate and amorphous polyolefin are preferable.

The thickness of the substrate is not restricted and may be properly selected depending on the application.

When a reflective layer is employed, a material having a sufficiently high reflectivity at the wavelength of a reproducing light is preferable as a material used for this layer. For example, metals such as Au, Al, Ag, Cu, Ti, Cr, Ni, Pt, Ta and Pd may be used individually or as an alloy thereof. Among them, in terms of high reflectivity, Au, Al and Ag are most preferred. Also, other elements may be comprised while the above metals are main components; these elements include metals and semi-metals such as Mg, Se, Hf, V, Nb, Ru, W, Mn, Re, Fe, Co, Rh, Ir, Zn, Cd, Ga, In, Si, Ge, Te, Pb, Po, Sn and Bi. Among these, a material comprising Ag or Al as a main component is most preferred in terms of low cost and high reflectivity. In that case, the composition of Ag or Al is preferably 90% by mass or greater as a main component to utilize the characteristics of Ag and Al.

In addition, a multilayer film may be formed by alternatively laminating a non-metal thin film with low refractive index and a non-metal thin film with high refractive index and used as a reflective layer.

Examples of film formation method employed for a reflective layer includes a sputtering method, an ion plating method, a chemical vapor deposition method and a vacuum vapor deposition method.

The thickness of the reflective layer is preferably 30 nm to 300 nm in a single-layer configuration (for example, an optical disc called a single layer).

In a multi-layer configuration such as an optic disc called a dual layer, a reflective layer other than the furthest layer from the laser beam incident plane is in general called a translucent layer since the layer must transmit the laser beam; the thickness of the translucent layer is preferably 3 nm to 40 nm.

Additionally, a conventionally known organic or inorganic intermediate layer and adhesive layer may be employed over the substrate or under the reflective layer in order to improve the reflectivity, the recording property and the adhesiveness.

A protective layer may be appropriately employed over the reflective layer or between the constitutive layers.

For the protective layer, any conventionally known material that functions to protect from external force may be used. Examples of an organic material include a thermoplastic resin, a thermosetting resin, an electron radiation curing resin and a UV-cure resin. Examples of a UV-cure resin include an acrylate resin such as urethane acrylate, epoxy acrylate and polyester acrylate. Also, examples of an inorganic material include $SiO_2$, $SiN_4$, $MgF_2$ and $SnO_2$. These materials may be used individually or as a mixture; multiple layers may be employed instead of a single layer.

Examples of a film formation method employed for a protective layer includes, similarly to a recording layer, an coating method such as a spin-coating method and a casting method, a sputtering method and a chemical vapor deposition method. Among these, a spin-coating method is preferable.

Regarding a thermoplastic resin and a thermosetting resin, a layer is formed by an application of a coating liquid in which the resin is dissolved in an appropriate solvent, followed by drying. For a UV-cure resin, a layer is formed by an application of the resin as it is or as a coating liquid in which the resin is dissolved in an appropriate solvent, followed by hardening by irradiation of a UV light.

The thickness of the protective layer is preferably 0.1 μm to 100 μm, more preferably 3 μm to 30 μm.

An optical recording medium of the present invention may comprise another substrate laminated over the prescribed constitutive layers, or it may comprise a multilayer structure in which constitutive layers are facing each other on the inward side. Alternatively, it may comprise a multi-layer configuration where guide grooves are formed with a UV-cure resin over a prescribed constitutive layer, over which another prescribed constitutive layer is laminated. Furthermore, a UV-cure resin layer or an inorganic thin film may be deposited over the free surface of the substrate for surface protection and prevention of dust attachment. An optical recording medium of the present invention is not restricted to a configuration that permits recording/reproducing by applying a light from the side of only the substrate, but it is possible to install a prescribed cover layer over constitutive layers and apply a light from the side of this cover layer for recording/reproducing. higher-density recording is possible by installing a thin cover layer and permitting recording/reproducing from this cover layer. The cover layer generally comprises a polycarbonate sheet or a UV-cure resin. The cover layer according to the present invention may include an adhesive layer for bonding the cover layer with an adjacent layer.

A laser beam used for a write-once-read-many optical recording medium of the present invention is preferably short in its wavelength for higher-density recording; the wavelength is more preferably 350 nm to 530 nm. A laser beam with a center wavelength of 405 nm is a typical example.

According to the present invention, the combination of the recording layer, the undercoat layer and the overcoat layer that constitute the write-once-read-many optical recording medium and the range of thicknesses are optimized, and a write-once-read-many optical recording medium with superior reflectivity, recording sensitivity and recording properties such as SDR, jitter, PRSNR and error rate may be provided, where PRSNR is an abbreviation of Partial Response Signal to Noise Ratio, an index representing the signal quality based on HD DVD standards.

Also, by restricting the layer composition, the range of thicknesses and the material of each layer and by combining these, a high-performance write-once-read-many optical recording medium with simple layer composition may be manufactured at a low cost. In addition, according to the present invention, a write-once-read-many optical recording medium with high reliability may be provided, and also, according to the present invention, a write-once-read-many optical recording medium which enables high-density recording compared to conventional equivalents may be provided.

Hereinafter, the present invention will be illustrated in more detail with reference to examples and comparative examples given below, but these are not to be construed as limiting the present invention.

EXAMPLE 1

Figure 16:
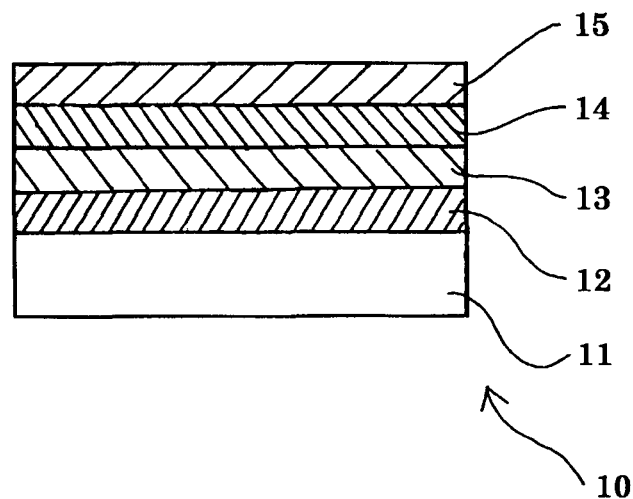
FIG. 16 is an exemplary view schematically showing a write-once-read-many optical recording medium of the present invention.

As shown in FIG. 16, a write-once-read-many optical recording medium 10 was prepared by sequentially forming by sputtering, on a polycarbonate substrate 11 with guide grooves having a depth of 20 nm (not shown), a recording layer 12, an overcoat layer 13, a reflective layer 14 and a protective layer 15 comprising a UV-cure resin and having a thickness of approximately 5 μm.

The recording layer comprised $Bi_2O_3$ and had a thickness of 10 nm. The overcoat layer comprised ZnS and $SiO_2$ (the ratio of ZnS to $SiO_2$ was 80 to 20 on a molar basis) and had a thickness of 17 nm. The reflective layer comprised an Ag alloy (AgIn, with the In composition of approximately 0.5% by mass) and had a thickness of 100 nm.

A recording was performed with an optical disk checker DDU-1000, manufactured by Pulstec Industrial Co., Ltd., with a wavelength of 405 nm, a numerical aperture of 0.65 and a beam diameter with which the laser intensity at the center is $1/e^2$ of approximately 0.55 µm; according to a multi-level recording procedure on an optical recording medium using a step-wise waveform generated by AWG-610, manufactured by Sony Tektronics, Inc., for configuration of recording strategy (control of the emission waveform of the laser beam in recording).

Figure 14:
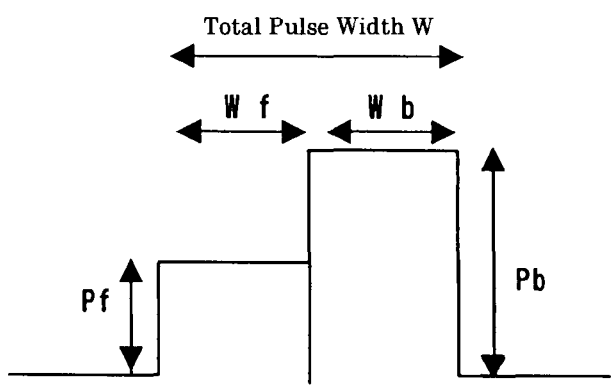
FIG. 14 shows a schematic diagram of a recording strategy.

More specifically, a recording was performed according to a multi-level recording procedure with eight levels (levels 0 to 7) having a unit recording area length (a recording unit of a recording mark) of 0.24 µm, the duration of the unit recording area length of 48 ns and a recording/reproducing linear velocity of 5.0 m/s, and a stepwise waveform was recorded, employing a strategy shown in FIG. 14.

A basic pattern was to record a multi level $m_0$ (level 0) having five consecutive recording units (hypothetical recording areas) and a multi level $m_i$ having 32 consecutive recording units (hypothetical recording areas), and a pattern of recording the basic pattern for each of the all multi levels $m_i$ (i=0 to 7) was used. This stepwise waveform is the state where intersymbol interference is fixed, and ideally each of the multi levels $m_0$ to $m_7$ (levels 0 to 7) shows a fixed reflective level.

Here, the unit recording area duration corresponds to 48 ns, and the following values were fixed at the specified values: a pulse length of a laser beam for forming level 1 (a recording mark comprising the second smallest size and/or depth) is 7.2 ns; a pulse length of a laser beam for forming level 2 is 10.4 ns; a pulse length of a laser beam for forming level 3 is 12.8 ns; a pulse length of a laser beam for forming level 4 is 15.2 ns; a pulse length of a laser beam for forming level 5 is 16.8 ns; a pulse length of a laser beam for forming level 6 is 19.2 ns; and a pulse length of a laser beam for forming level 7 (a recording mark comprising the largest size and/or depth) is 24.0 ns, wherein a pulse length corresponds to a duration of a pulse voltage superimposed on a laser beam element.

Figure 15:
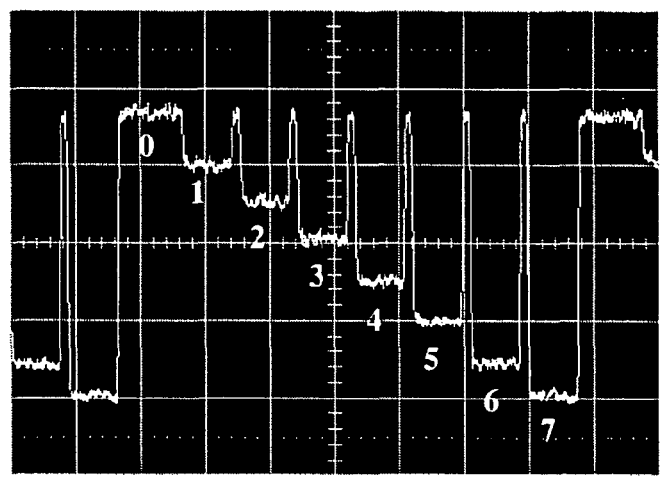
FIG. 15 is a view showing a reproducing signal obtained from a portion where a stepwise waveform is recorded.

A stepwise waveform was recorded as described above, and it was found as shown in FIG. 15 that a recording with uniform reproducing signal levels at the continuous part of each multi-level (this is nearly ideal) and with significantly high linearity of multi-levels (multi-levels and their reproducing signal levels were approximately proportional) may be achieved. Also, the reflectivity at a flat part of the substrate was 35%.

On the other hand, a write-once-read-many optical recording medium comprising a recording layer comprising a conventional pigment results in non-uniform reproducing signal levels at the continuous part of each multi-level due to intersymbol interference, and it was confirmed the medium was not suitable as a write-once-read-many optical recording medium for multi-level recording.

EXAMPLE 2

As shown in FIG. 16, a write-once-read-many optical recording medium 10 was prepared by sequentially forming by sputtering, on a polycarbonate substrate 11 with guide grooves having a depth of 21 nm (not shown), a recording layer 12, an overcoat layer 13, a reflective layer 14 and a protective layer 15 comprising a UV-cure resin and having a thickness of approximately 5 µm.

More specifically, write-once-read-many optical recording media were prepared with the recording layer comprising $Bi_2O_3$ and having a thickness of 10 nm; the reflective layer comprising an Ag alloy (AgBi, with the Bi composition of approximately 0.5% by mass) and having a thickness of 100 nm; and the overcoat layer comprising ZnS and $SiO_2$ (the ratio of ZnS to $SiO_2$ was 80 to 20 on a molar basis) and having various thicknesses.

The reflectivity and jitter of these optical recording media were measured by an optical disk checker DDU-1000, manufactured by Pulstec Industrial Co., Ltd. with a wavelength of 405 nm and a numerical aperture of 0.65.

Figure 17:
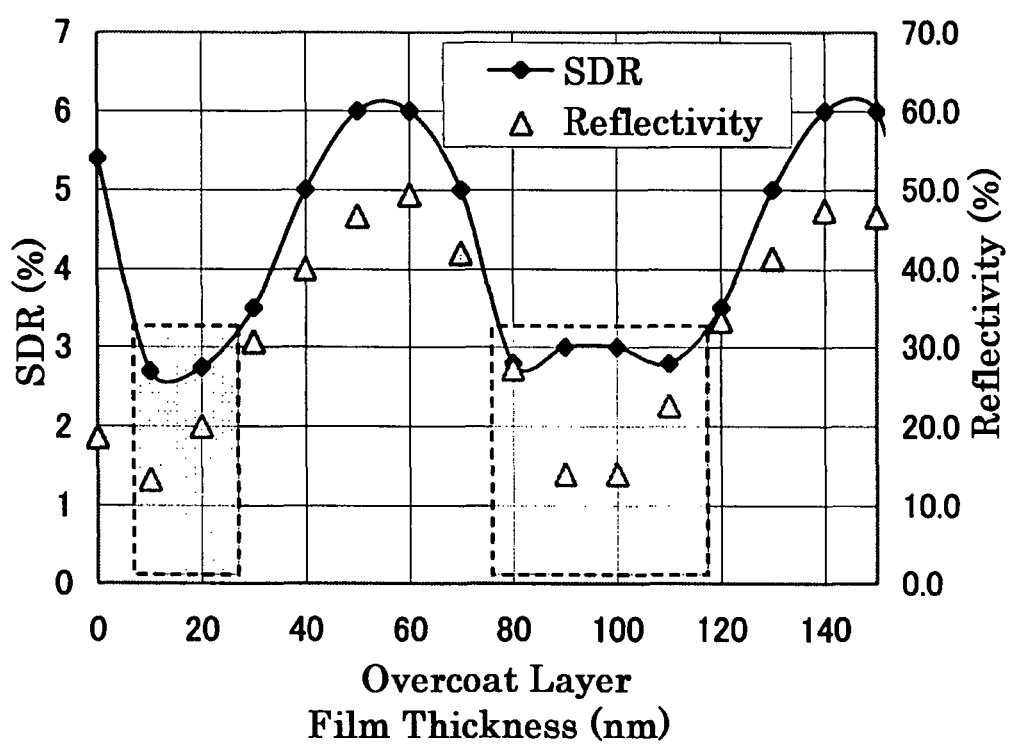
FIG. 17 is a view showing the correlation of the thickness of an overcoat layer with reflectivity and SDR.

As shown in FIG. 17, suitable SDR was observed when the thickness of the overcoat layer was in the ranges of 5 nm to 25 nm and 75 nm to 120 nm. Here, 'favorable SDR' implies SDR of 3.2% or less since it has been confirmed that SDR defined in the Equation (1) should be 3.2% or less for a valid multi-level recording system.

FIG. 17 also shows a certain degree of correlation between SDR and reflectivity. That is, the reflectivity at a flat part of the substrate is 35% or less when SDR is 3.2% or less. Also, the reflectivity of the write-once-read-many optical recording media of the present Example varies depending on the thickness of the overcoat layer, and it was found that SDR increased in the region the reflectivity became too large.

The cause is the degradation of the sensitivity associated with the increase in the reflectivity. It is considered that SDR is degraded because large recording power required for recording in the region with high reflectivity increases the amount of crosstalk to adjacent marks and adjacent tracks. Also, the sensitivity is generally reduced even favorable SDR is achieved in the high reflectivity region; therefore, such optical recording medium is not suitable as a commercial product.

However, the most preferable thickness of the Example is only the most preferable value of the present Example; it does not indicate the most preferable value of the present invention as a whole (the most preferable range of thicknesses of the present Example is included in that of the present invention).

EXAMPLE 3

As shown in FIG. 16, a write-once-read-many optical recording medium 10 was prepared by sequentially forming by sputtering, on a polycarbonate substrate 11 with guide grooves having a depth of 22 nm (not shown), a recording layer 12, an overcoat layer 13, a reflective layer 14 and a protective layer 15 comprising a UV-cure resin and having a thickness of approximately 5 µm.

More specifically, write-once-read-many optical recording media were prepared with the overcoat layer comprising ZnS and $SiO_2$ (the ratio of ZnS to $SiO_2$ was 80 to 20 on a molar basis) and having a thickness fixed at 15 nm; the reflective layer comprising an Ag alloy (AgBi, with the Bi composition of approximately 0.5% by mass) and having a thickness fixed at 100 nm; and the recording layer comprising $Bi_2O_3$ and having various thicknesses.

The reflectivity and SDR of these optical recording media were measured by an optical disk checker DDU-1000, manufactured by Pulstec Industrial Co., Ltd. with a wavelength of 405 nm and a numerical aperture of 0.65.

Figure 18:
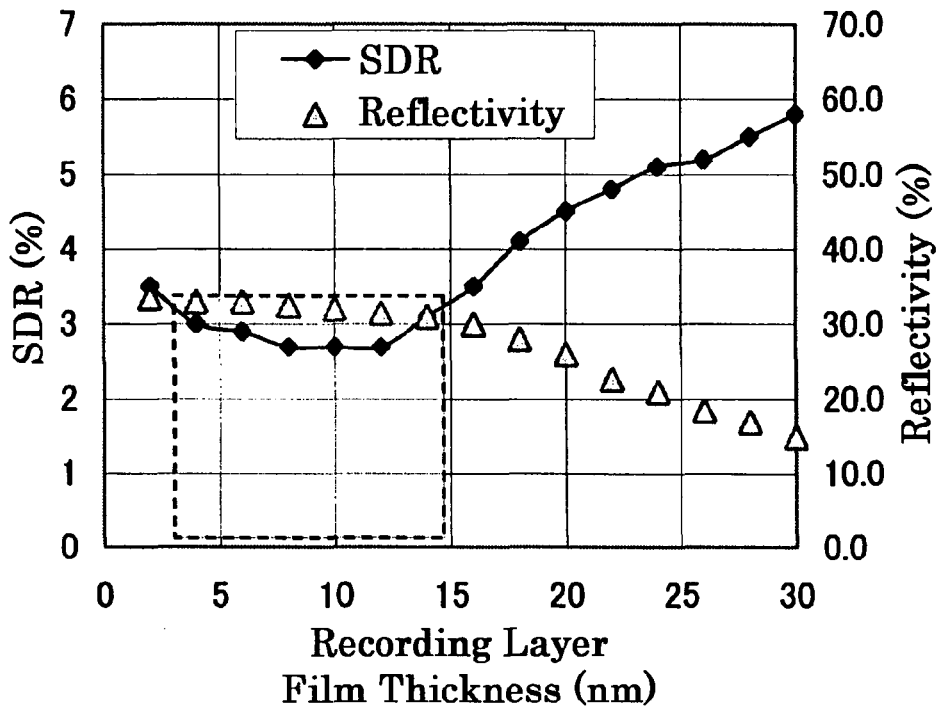
FIG. 18 is a view showing the correlation of the thickness of a recording layer with reflectivity and SDR.

As a result indicated by FIG. 18, suitable SDR was observed when the thickness of the recording layer was in the range of 3 nm to 15 nm. There is a tendency that the sensitivity is reduced due to insufficient modulation when the thickness of the recording layer is less than 3 nm. On the other hand, the value of SDR deteriorates with the thickness of the recording layer exceeding 15 nm because the thermal interference in the recording layer increases.

However, the most preferable thickness of the Example is only the most preferable value of the present Example; it does not indicate the most preferable value of the present invention as a whole (the most preferable range of thicknesses of the present Example is included in that of the present invention).

EXAMPLE 4

Figure 19:
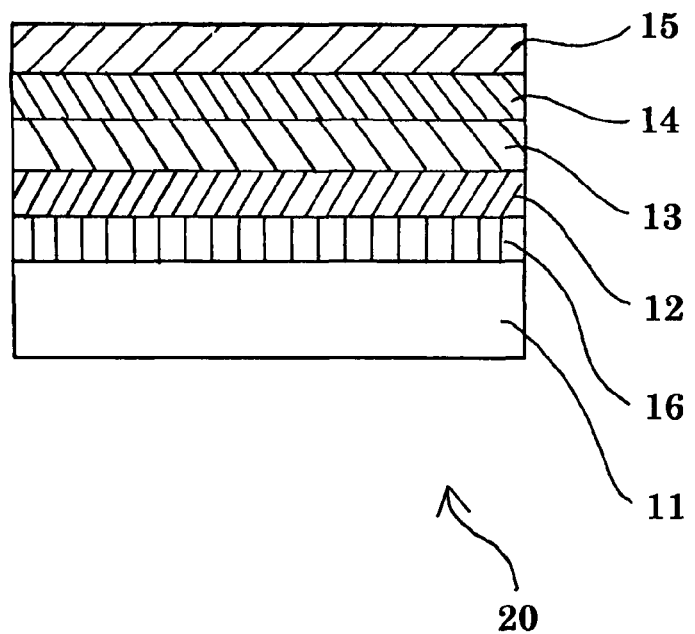
FIG. 19 is another exemplary view schematically showing a write-once-read-many optical recording medium of the present invention.

As shown in FIG. 19, a write-once-read-many optical recording medium 20 was prepared by sequentially forming by sputtering, on a polycarbonate substrate 11 with guide grooves having a depth of 21 nm (not shown), an undercoat layer 16, a recording layer 12, an overcoat layer 13, a reflective layer 14 and a protective layer 15 comprising a UV-cure resin and having a thickness of approximately 5 μm.

More specifically, write-once-read-many optical recording media were prepared with the recording layer comprising $Bi_2O_3$ and having a thickness fixed at 10 nm; the overcoat layer comprising ZnS and $SiO_2$ (the ratio of ZnS to $SiO_2$ was 80 to 20 on a molar basis) and having a thickness fixed at 15 nm; the reflective layer comprising an Ag alloy (AgIn, with the In composition of approximately 0.5% by mass) and having a thickness fixed at 100 nm; and the undercoat layer comprising ZnS and $SiO_2$ (the ratio of ZnS to $SiO_2$ was 80 to 20 on a molar basis) and having various thicknesses.

The reflectivity and SDR of these optical recording media were measured by an optical disk checker DDU-1000, manufactured by Pulstec Industrial Co., Ltd. with a wavelength of 405 nm and a numerical aperture of 0.65.

Figure 20:
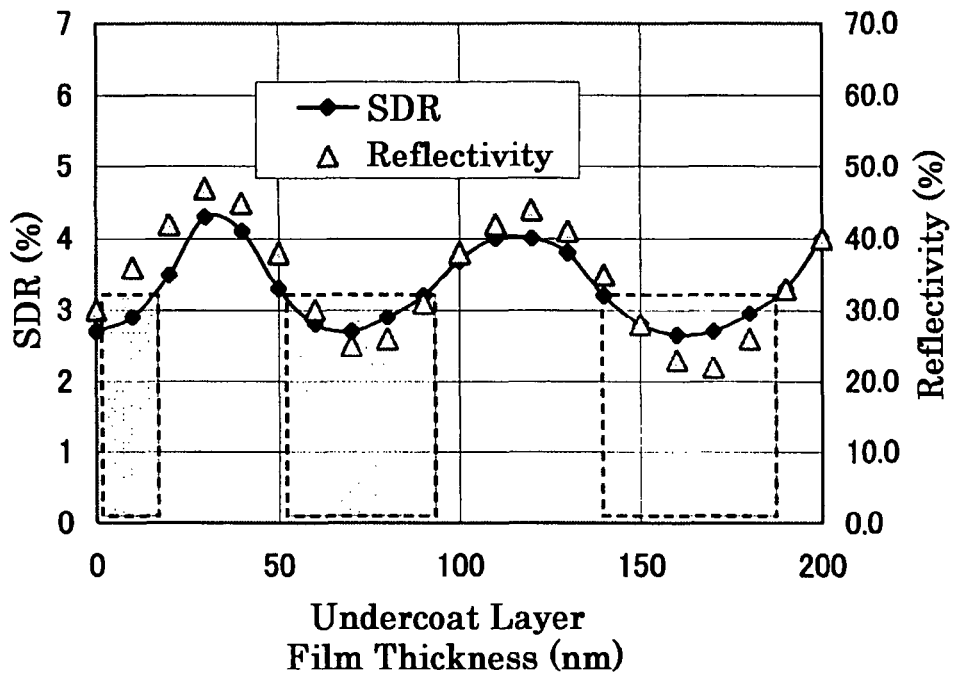
FIG. 20 is a view showing the correlation of the thickness of an undercoat layer with reflectivity and SDR.

As a result indicated by FIG. 20, suitable SDR was observed when the thickness of the undercoat layer was in the ranges of 0 nm to 15 nm, 50 nm to 90 nm and 140 nm to 190 nm (This is approximately equivalent to the case where the thickness of the overcoat layer was set at 15 nm in FIG. 6. However, since the complex refractive indices of the recording layer, the undercoat layer and the overcoat layer are different from the calculation condition, the most preferable range of the thickness for the overcoat layer is slightly different).

FIG. 20 also shows a certain degree of correlation between SDR and reflectivity. In other words, the reflectivity at a flat part of the substrate is 35% or less when SDR is 3.2% or less. Also, it was found that the reflectivity of the write-once-read-many optical recording medium of the present Example varied depending on the thickness of the undercoat layer and that SDR increased in the region the reflectivity became too large.

The cause is the degradation of the sensitivity associated with the increase in the reflectivity. It is considered that SDR is degraded because large recording power required for recording in the region with high reflectivity increases the amount of crosstalk to adjacent marks and adjacent tracks.

However, the most preferable thickness of the Example is only the most preferable value of the present Example; it does not indicate the most preferable value of the present invention as a whole (the most preferable range of thicknesses of the present Example is included in that of the present invention).

In addition, SDR was further improved when the $Bi_2O_3$ film as the recording layer comprised any element M selected the following: Al, Cr, Mn, Sc, In, Ru, Rh, Co, Fe, Cu, Ni, Zn, Li, Si, Ge, Zr, Ti, Hf, Sn, Pb, Mo, V and Nb. This is presumably because the heat conductivity of the recording layer was reduced due to the addition of the element M, and the crystal at the recording mark was further refined.

The amount of the element M added is preferably set within the range where the ratio of Bi to the sum of Bi and the element M on an atomic basis (Bi/Bi+element M) is not below 0.3.

Next, jitter according to binary recording process was evaluated.

EXAMPLE 5

A write-once-read-many optical recording medium (a so-called write-once-read-many optical recording medium compliant with Blu-ray standards) was prepared by sequentially forming by sputtering, on a polycarbonate substrate with guide grooves having a depth of 22 nm and a thickness of 1.1 mm, a reflective layer, an overcoat layer and a recording layer, and by bonding a cover layer having a thickness of 0.08 mm with a two-sided adhesive sheet having a thickness of 0.02 mm.

More specifically, write-once-read-many optical recording media were prepared with the recording layer comprising $Bi_2O_3$ and having a thickness fixed at 10 nm; the reflective layer comprising an Ag alloy (AgBi, with the Bi composition of approximately 0.5% by mass) and having a thickness fixed at 100 nm; and the overcoat layer comprising ZnS and $SiO_2$ (the ratio of ZnS to $SiO_2$ was 80 to 20 on a molar basis) and having various thicknesses.

Recording/reproducing was performed from the side of the cover layer of these optical recording media with an optical disk checker DDU-1000, manufactured by Pulstec Industrial Co., Ltd. with a wavelength of 405 nm and a numerical aperture of 0.85, and the reflectivity and jitter of these optical recording media were measured.

Figure 21:
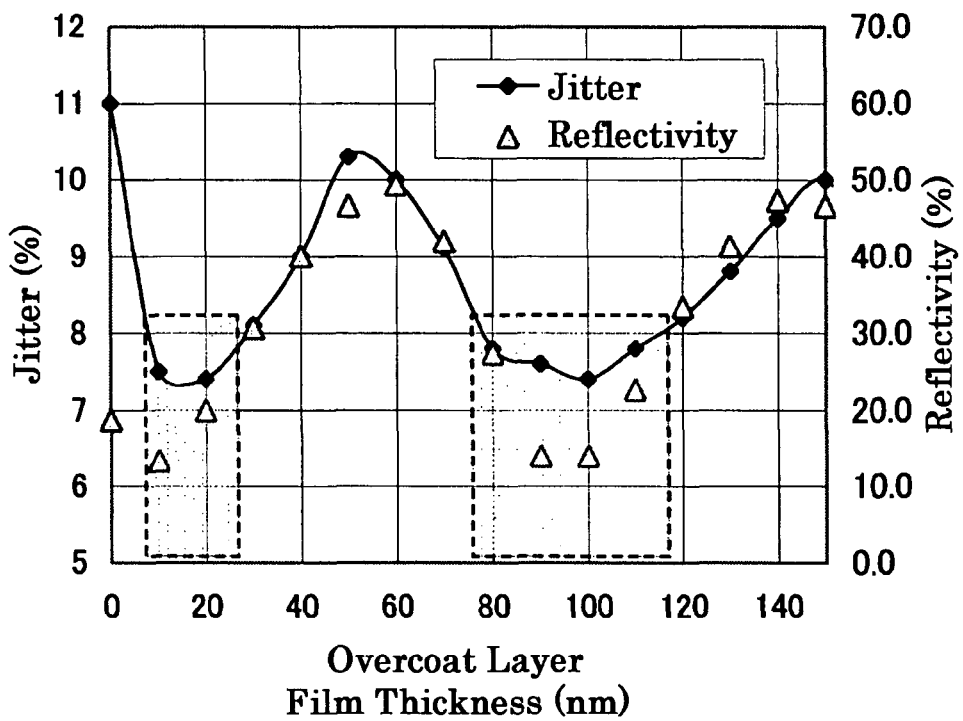
FIG. 21 is a view showing the correlation of the thickness of an overcoat layer with reflectivity and jitter.

As a result indicated by FIG. 21, suitable jitter was obtained when the thickness of the overcoat layer was in the ranges of 5 nm to 30 nm and 75 nm to 120 nm. The benchmark of jitter was set at 8.5%; a favorable range of the thickness was defined when the jitter was below the benchmark (the same applies to the Examples below).

FIG. 21 also shows a certain degree of correlation between jitter and reflectivity. That is, the reflectivity at a flat part of the substrate is 35% or less when jitter is 8.5% or less. Also, it was found that the reflectivity of the write-once-read-many optical recording medium of the present Example varied depending on the thickness of the overcoat layer and that jitter increased in the region the reflectivity became too large.

The cause is the degradation of the sensitivity associated with the increase in the reflectivity. It is considered that jitter is degraded because large recording power required for recording in the region with high reflectivity increases the amount of crosstalk to adjacent marks and adjacent tracks. Also, the sensitivity is generally reduced even favorable jitter is achieved in the high reflectivity region; therefore, such optical recording medium is not suitable as a commercial product.

However, the most preferable thickness of the Example is only the most preferable value of the present Example; it does not indicate the most preferable value of the present invention as a whole (the most preferable range of thicknesses of the present Example is included in that of the present invention).

EXAMPLE 6

A write-once-read-many optical recording medium was prepared by sequentially forming by sputtering, on a polycarbonate substrate with guide grooves having a depth of 23 nm and a thickness of 1.1 mm, a reflective layer, an overcoat layer and a recording layer, and by bonding a cover layer having a thickness of 0.08 mm with a two-sided adhesive sheet having a thickness of 0.02 mm.

More specifically, write-once-read-many optical recording media were prepared with the overcoat layer comprising ZnS and $SiO_2$ (the ratio of ZnS to $SiO_2$ was 80 to 20 on a molar basis) and having a thickness fixed at 15 nm; the reflective layer comprising an Ag alloy (AgBi, with the Bi composition of approximately 0.5% by mass) and having a thickness fixed at 100 nm; and the recording layer comprising $Bi_2O_3$ and having various thicknesses.

Recording/reproducing was performed from the side of the cover layer of these optical recording media with an optical disk checker DDU-1000, manufactured by Pulstec Industrial Co., Ltd. with a wavelength of 405 nm and a numerical aperture of 0.85, and the reflectivity and jitter of these optical recording media were measured.

Figure 22:
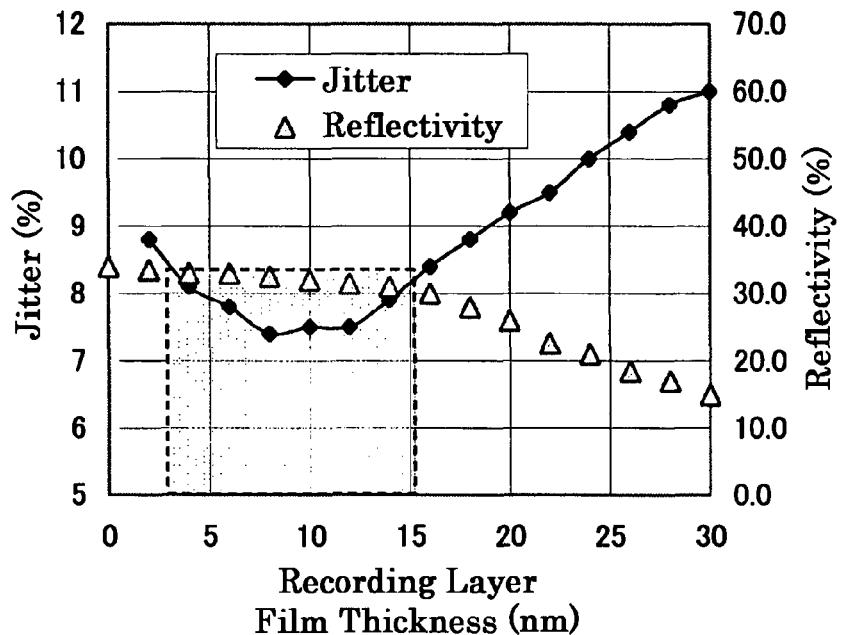
FIG. 22 is a view showing the correlation of the thickness of a recording layer with reflectivity and jitter.

As a result indicated by FIG. 22, suitable jitter was obtained when the thickness of the recording layer was in the ranges of 3 nm to 15 nm. There is a tendency that the sensitivity is reduced due to insufficient modulation when the thickness of the recording layer is less than 3 nm. On the other hand, the value of jitter deteriorates with the thickness of the recording layer exceeding 15 nm because the thermal interference in the recording layer increases. FIG. 22 also shows a certain degree of correlation between jitter and reflectivity. That is, the reflectivity at a flat part of the substrate is 35% or less when jitter is 8.5% or less.

However, the most preferable thickness of the Example is only the most preferable value of the present Example; it does not indicate the most preferable value of the present invention as a whole (the most preferable range of thicknesses of the present Example is included in that of the present invention).

EXAMPLE 7

A write-once-read-many optical recording medium was prepared by sequentially forming by sputtering, on a polycarbonate substrate with guide grooves having a depth of 21 nm and a thickness of 1.1 mm, a reflective layer, an overcoat layer, a recording layer and an undercoat layer, and by bonding a cover layer having a thickness of 0.08 mm with a two-sided adhesive sheet having a thickness of 0.02 mm.

More specifically, write-once-read-many optical recording media were prepared with the recording layer comprising $Bi_2O_3$ and having a thickness fixed at 10 nm; the overcoat layer comprising ZnS and $SiO_2$ (the ratio of ZnS to $SiO_2$ was 80 to 20 on a molar basis) and having a thickness fixed at 15 nm; the reflective layer comprising an Ag alloy (AgBi, with the Bi composition of approximately 0.5% by mass) and having a thickness fixed at 100 nm; and the undercoat layer comprising ZnS and $SiO_2$ (the ratio of ZnS to $SiO_2$ was 80 to 20 on a molar basis) and having various thicknesses.

Recording/reproducing was performed from the side of the cover layer of these optical recording media with an optical disk checker DDU-1000, manufactured by Pulstec Industrial Co., Ltd. with a wavelength of 405 nm and a numerical aperture of 0.85, and the reflectivity and jitter of these optical recording media were measured.

Figure 23:
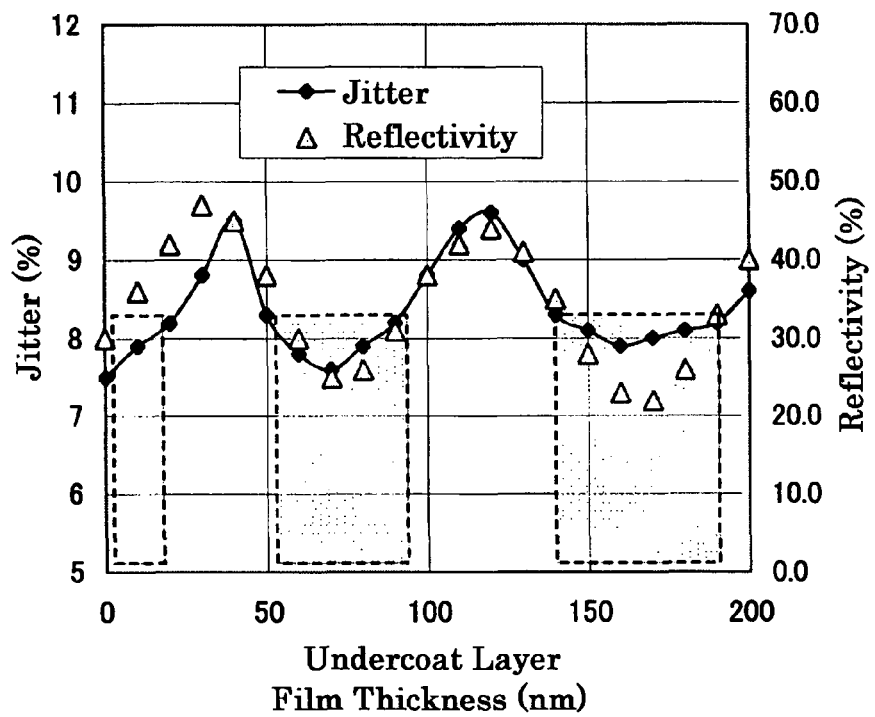
FIG. 23 is a view showing the correlation of the thickness of an undercoat layer with reflectivity and jitter.

As a result indicated by FIG. 23, suitable jitter was observed when the thickness of the recording layer was in the ranges of 0 nm to 15 nm, 50 nm to 90 nm and 140 nm to 190 nm (this was approximately equivalent to the case where the thickness of the overcoat layer was set at 15 nm in FIG. 6. However, the undercoat layer and the overcoat layer are different from the calculation condition; the most preferable range of the thickness for the overcoat layer is slightly different since the complex refractive indices of the recording layer).

FIG. 23 also shows a certain degree of correlation between jitter and reflectivity. That is, the reflectivity at a flat part of the substrate is 35% or less when jitter is 8.5% or less. Also, it was found that the reflectivity of the write-once-read-many optical recording medium of the present Example varied depending on the thickness of the undercoat layer and that jitter increased in the region the reflectivity became too large.

The cause is the degradation of the sensitivity associated with the increase in the reflectivity. It is considered that jitter is degraded because large recording power required for recording in the region with high reflectivity increases the amount of crosstalk to adjacent marks and adjacent tracks.

However, the most preferable thickness of the Example is only the most preferable value of the present Example; it does not indicate the most preferable value of the present invention as a whole (the most preferable range of thicknesses of the present Example is included in that of the present invention).

In addition, jitter was further improved when the $Bi_2O_3$ film as the recording layer comprises any element M selected the following: Al, Cr, Mn, Sc, In, Ru, Rh, Co, Fe, Cu, Ni, Zn, Li, Si, Ge, Zr, Ti, Hf, Sn, Pb, Mo, V and Nb. This is presumably because the heat conductivity of the recording layer is reduced due to the addition of the element M, and the crystal at the recording mark was further refined.

The amount of the element M added is preferably set within the range where the ratio of Bi to the sum of Bi and the element M on an atomic basis (i.e. Bi/Bi+element M) is not below 0.3.

EXAMPLES 8 TO 32

The importance of a sulfide comprised in the overcoat layer and/or the undercoat layer of a write-once-read-many optical recording medium of the present invention was examined.

A write-once-read-many optical recording medium was prepared by sequentially forming by sputtering, on a polycarbonate substrate with guide grooves having a depth of 23 nm and a thickness of 0.6 mm, an undercoat layer (there were cases this was omitted), a recording layer, an overcoat layer, a reflective layer and a protective layer comprising a UV-cure resin and having a thickness of approximately 5 µm, and by bonding over this protective layer a dummy substrate having a thickness of 0.6 mm.

More specifically, the recording layer comprised $Bi_{10}Fe_5O_x$ or $Bi_6Fe_5Ox$ having a thickness of 10 nm to 15 nm; the undercoat layer and the overcoat layer comprised the materials shown in Table 2; the thickness of the undercoat layer had a thickness of 10 nm to 30 nm, and the overcoat layer had a thickness of 15 nm to 25 nm; and the reflective layer comprised an Ag alloy or an Al alloy having a thickness of 40 nm to 100 nm.

The composition of the recording layer was examined by Rutherford back scattering (RBS), and it was confirmed that Bi was not perfectly oxidized but that Bi had oxygen vacancy (i.e. Bi existed as Bi+BiO, or Bi+BiO+BiFeO).

Recording/reproducing compliant with HD DVD-R standards was performed on these optical recording media with an optical disk checker DDU-1000, manufactured by Pulstec Industrial Co., Ltd. with a wavelength of 405 nm and a numerical aperture of 0.65. It is to be noted that all the optical recording media of the Examples 8 to 32 satisfy the reflectivity at a flat part of 35% or less.

Table 2 shows the evaluation results of the recording sensitivity and PRSNR when the recording/reproducing compliant with HD DVD-R standards was performed. Regarding the recording sensitivity, a case where the recording power with the most favorable PRSNR was 10 mW or below is indicated by 'OK'; 'NG', otherwise. Regarding PRSNR, the most favorable PRSNR of 15 or greater is indicated by 'OK'; 'NG', otherwise.

TABLE 2

| | Undercoat Layer Material | Overcoat Layer Material | Recording Sensitivity | PRSNR |
|---|---|---|---|---|
| Example 8 | None | $SiO_2$ | NG | OK |
| Example 9 | None | $ZnS$—$SiO_2$ (80:20) | OK | OK |
| Example 10 | None | $Al_2O_3$ | NG | OK |
| Example 11 | $ZnS$—$SiO_2$ (80:20) | $MgF_2$ | OK | OK |
| Example 12 | $ZnS$—$SiO_2$ (80:20) | $SiO_2$ | OK | OK |
| Example 13 | $ZnS$—$SiO_2$ (80:20) | $Al_2O_3$ | OK | OK |
| Example 14 | $ZnS$—$SiO_2$ (80:20) | $ZnS$—$SiO_2$ (70:30) | OK | OK |
| Example 15 | $ZnS$—$SiO_2$ (80:20) | $In_2O_3$—$ZnO$ (90:10) | OK | OK |
| Example 16 | $ZnS$—$SiO_2$ (70:30) | CaS | OK | OK |
| Example 17 | $ZnS$—$SiO_2$ (70:30) | GeS | OK | OK |
| Example 18 | $ZnS$—$SiO_2$ (70:30) | SrS | OK | OK |
| Example 19 | $ZnS$—$SiO_2$ (70:30) | $SrS$—$SiO_2$ (90:10) | OK | OK |
| Example 20 | $Al_2O_3$ | $ZnS$—$SiO_2$ (80:20) | OK | OK |
| Example 21 | $Al_2O_3$ | ZnS | OK | OK |
| Example 22 | $In_2O_3$—$ZnO$ (90:10) | $Al_2O_3$ | NG | OK |
| Example 23 | $In_2O_3$—$ZnO$ (90:10) | $SiO_2$ | NG | OK |
| Example 24 | $In_2O_3$—$ZnO$ (90:10) | $MgF_2$ | NG | OK |
| Example 25 | $In_2O_3$—$ZnO$ (90:10) | $ZnS$—$SiO_2$ (80:20) | OK | OK |
| Example 26 | $In_2O_3$—$ZnO$ (90:10) | $ZnS$—$SiO_2$ (50:50) | NG | OK |
| Example 27 | AlN | $ZnS$—$SiO_2$ (80:20) | OK | OK |
| Example 28 | AlN | $ZnS$—$SiO_2$ (90:10) | OK | OK |
| Example 29 | $MgF_2$ | $ZnS$—$SiO_2$ (80:20) | OK | OK |
| Example 30 | ZrN | $ZnS$—$SiO_2$ (80:20) | OK | OK |
| Example 31 | SiN | $ZnS$—$SiO_2$ (70:30) | OK | OK |
| Example 32 | SiN | $ZnS$—$SiO_2$ (80:20) | OK | OK |

The above results confirm that a sulfide comprised in the overcoat layer and/or the undercoat layer of a write-once-read-many optical recording medium comprising bismuth and/or an oxide of bismuth as a main component of the present invention is very effective.

EXAMPLES 33 TO 44

The validity of setting the lower limit of the undercoat layer of the present invention to be 10 nm was examined.

A write-once-read-many optical recording medium was prepared by sequentially forming by sputtering, on a polycarbonate substrate with guide grooves having a depth of 24 nm and a thickness of 0.6 mm, an undercoat layer, a recording layer, an overcoat layer, a reflective layer and a protective layer, and by bonding a dummy substrate having a thickness of 0.6 mm.

The materials and the thicknesses of the layers are shown in Table 3. In Table 3, a value in parentheses indicates a thickness, and a value in square brackets indicates a molar ratio.

Here, the recording layer comprised $Bi_{10}Fe_5O_x$ having a thickness of 10 nm to 15 nm. It was confirmed by Rutherford back scattering (RBS) that Bi was not perfectly oxidized but that Bi had oxygen vacancy (i.e. Bi existed as Bi+BiO, or Bi+BiO+BiFeO).

Recording/reproducing compliant with HD DVD-R standards was performed on these optical recording media with an optical disk checker DDU-1000, manufactured by Pulstec Industrial Co., Ltd. with a wavelength of 405 nm and a numerical aperture of 0.65. It is to be noted that all the optical recording media of the Examples 33 to 44 satisfy the reflectivity at a flat part of 35% or less.

Table 4 shows the results of evaluation in which recording/reproducing compliant with HD DVD-R standards was performed on samples and the changes by a preservation test (at a temperature of 80° C. and a relative humidity of 85%) were observed in terms of the following archival properties: PRSNR, Simulated bit Error Rate (SbER) and the reflectivity of the recording portion (I11H). Table 4 also shows the results of evaluation in which a preservation test (at a temperature of 80° C. and a relative humidity of 85%) was performed on non-recorded samples, recording/reproducing compliant with HD DVD-R standards was performed on the samples, and the changes were observed in terms of the following shelving properties: PRSNR, SbER and the reflectivity of the recording portion (I11H).

A sample was considered unreliable when its PRSNR was less than 15 or SbER was over $5 \times 10^{-5}$ regarding the archival properties, which is marked by 'NG' in the assessment column of Table 4.

Regarding shelving properties, a sample was considered unreliable when any one of the recording power values Pw, Pb1 and Pb3 after the preservation test differed by more than 0.5 mW from those recorded at 0 hr of the preservation test, which is marked by 'NG' in the assessment column of Table 4.

Here, the term Pw referred in the present Examples is Peak power mentioned in 'DVD Specifications for High Density Recordable disc (HD DVD-R) Part 1 (Version 1.0).' Similarly, Pb1 is Bias power 1; Pb3 is Bias power 2 and Bias power 3 (in the present Examples, Bias power 2 is equal to Bias power 3).

The results of Table 4 verify that the reliability was ensured by setting the thickness of the undercoat layer to be 10 nm or greater in the write-once-read-many optical recording medium of the present invention.

Also, regarding the combinations of the undercoat layer and the overcoat layer with which favorable recording properties were achieved in Examples 8 to 30, similar results in terms of reliability were obtained.

TABLE 3

| | Undercoat Layer | Recording Layer | Overcoat Layer | Reflective Layer |
|---|---|---|---|---|
| Example 33 | $Al_2O_3$ (5 nm) | $Bi_{10}Fe_5O_x$ (13 nm) | $ZnS$—$SiO_2$ [80:20] (20 nm) | AlTi (80 nm) |
| Example 34 | $Al_2O_3$ (5 nm) | $Bi_{10}Fe_5O_x$ (13 nm) | $ZnS$—$SiO_2$ [80:20] (20 nm) | AlTi (40 nm) |
| Example 35 | $ZnS$—$SiO_2$ [80:20] (7 nm) | $Bi_{10}Fe_5O_x$ (13 nm) | $SiO_2$ (15 nm) | AlTi (80 nm) |
| Example 36 | $ZnS$—$SiO_2$ [80:20] (7 nm) | $Bi_{10}Fe_5O_x$ (13 nm) | $SiO_2$ (20 nm) | AlTi (80 nm) |
| Example 37 | $Al_2O_3$ (8 nm) | $Bi_{10}Fe_5O_x$ (13 nm) | $ZnS$—$SiO_2$ [80:20] (20 nm) | AlTi (80 nm) |
| Example 38 | $ZnS$—$SiO_2$ [80:20] (8 nm) | $Bi_{10}Fe_5O_x$ (13 nm) | $ZnS$—$SiO_2$ [70:30] (15 nm) | AlTi (40 nm) |
| Example 39 | $Al_2O_3$ (8 nm) | $Bi_{10}Fe_5O_x$ (13 nm) | $ZnS$—$SiO_2$ [80:20] (20 nm) | AlTi (80 nm) |
| Example 40 | $Al_2O_3$ (10 nm) | $Bi_{10}Fe_5O_x$ (13 nm) | $ZnS$—$SiO_2$ [80:20] (20 nm) | AlTi (80 nm) |
| Example 41 | $ZnS$—$SiO_2$ [80:20] (10 nm) | $Bi_{10}Fe_5O_x$ (13 nm) | $ZnS$—$SiO_2$ [90:10] (20 nm) | AlTi (80 nm) |
| Example 42 | $Al_2O_3$ (15 nm) | $Bi_{10}Fe_5O_x$ (13 nm) | $ZnS$—$SiO_2$ [80:20] (20 nm) | AlTi (80 nm) |
| Example 43 | $ZnS$—$SiO_2$ [80:20] (15 nm) | $Bi_{10}Fe_5O_x$ (13 nm) | $ZnS$—$SiO_2$ [70:30] (20 nm) | AlTi (80 nm) |
| Example 44 | $ZnS$—$SiO_2$ [80:20] (20 nm) | $Bi_{10}Fe_5O_x$ (13 nm) | $ZnS$—$SiO_2$ [70:30] (25 nm) | AlTi (80 nm) |

TABLE 4

| | Preservation time (hr) | Archival Properties | | | | Shelving Properties | | | | | | |
|---|---|---|---|---|---|---|---|---|---|---|---|---|
| | | PRSNR | SbER | I11H (%) | Assessment | Pw (mW) | Pb1 (mW) | Pb3 (mW) | PRSNR | SbER | I11H (%) | Assessment |
| Example 33 | 0 | 24 | 1.2E−07 | 18.0 | OK | 8.5 | 3.5 | 0.0 | 24 | 1.21E−07 | 18.0 | OK |
| | 100 | 17 | 1.6E−05 | 23.1 | OK | — | — | — | — | — | — | — |
| | 200 | 17 | 3.9E−05 | 22.7 | OK | 10.2 | 4.0 | 0.0 | 25 | 1.77E−07 | 22.1 | NG |
| | 300 | 15 | 6.6E−05 | 22.7 | NG | 10.3 | 4.2 | 0.0 | 27 | 5.00E−08 | 22.4 | NG |
| Example 34 | 0 | 24 | 6.2E−07 | 15.8 | OK | 8.6 | 3.5 | 0.0 | 24 | 6.23E−07 | 15.8 | OK |
| | 100 | 15 | 7.8E−05 | 20.7 | NG | — | — | — | — | — | — | — |
| | 200 | 16 | 4.8E−05 | 20.7 | OK | 10.3 | 4.0 | 0.0 | 27 | 2.53E−08 | 20.3 | NG |
| | 300 | 14 | 7.1E−05 | 20.6 | NG | 10.4 | 4.0 | 0.0 | 28 | 5.33E−08 | 20.6 | NG |
| Example 35 | 0 | 22 | 1.5E−07 | 14.9 | OK | 12.2 | 4.0 | 0.0 | 22 | 1.47E−07 | 14.9 | OK |
| | 100 | 3 | 3.2E−02 | 14.0 | NG | 11.6 | 3.0 | 0.0 | 16 | 1.10E−05 | 10.0 | NG |
| Example 36 | 0 | 22 | 5.8E−07 | 18.7 | OK | 12.2 | 4.0 | 0.0 | 22 | 5.83E−07 | 18.7 | OK |
| | 100 | 7 | 2.6E−03 | 19.5 | NG | 12.2 | 3.0 | 0.0 | 13 | 3.50E−05 | 13.3 | NG |
| Example 37 | 0 | 24 | 6.7E−08 | 18.0 | OK | 9.0 | 3.5 | 0.0 | 24 | 6.73E−08 | 18.0 | OK |
| | 100 | 22 | 5.6E−07 | 22.1 | OK | — | — | — | — | — | — | — |
| | 200 | 20 | 4.7E−06 | 21.9 | OK | 9.6 | 4.0 | 0.0 | 17 | 1.83E−05 | 19.2 | NG |
| | 300 | 15 | 9.3E−05 | 22.1 | NG | 9.6 | 4.2 | 0.0 | 20 | 2.33E−06 | 19.5 | NG |
| Example 38 | 0 | 23 | 3.1E−07 | 15.1 | OK | 9.0 | 3.5 | 0.0 | 23 | 3.10E−07 | 15.1 | OK |
| | 100 | 14 | 1.2E−04 | 16.9 | NG | — | — | — | — | — | — | — |
| | 200 | 20 | 1.0E−06 | 17.5 | OK | 10.0 | 4.0 | 0.0 | 22 | 6.67E−07 | 15.3 | NG |
| | 300 | 18 | 3.8E−06 | 17.5 | OK | 10.3 | 4.0 | 0.0 | 23 | 2.10E−07 | 14.1 | NG |
| Example 39 | 0 | 25 | 1.0E−06 | 16.3 | OK | 9.0 | 3.5 | 0.0 | 25 | 1.04E−06 | 16.3 | OK |
| | 100 | 27 | 6.8E−08 | 19.6 | OK | — | — | — | — | — | — | — |
| | 200 | 24 | 1.1E−07 | 19.9 | OK | 9.9 | 3.5 | 0.0 | 19 | 1.73E−06 | 17.2 | NG |
| | 300 | 21 | 2.2E−06 | 20.0 | OK | 9.9 | 3.5 | 0.0 | 21 | 1.40E−06 | 17.3 | NG |
| Example 40 | 0 | 24 | 2.8E−07 | 18.1 | OK | 9.0 | 3.5 | 0.0 | 24 | 2.83E−07 | 18.1 | OK |
| | 100 | 20 | 3.2E−06 | 18.3 | OK | — | — | — | — | — | — | — |
| | 200 | 20 | 1.9E−06 | 18.0 | OK | 9.4 | 3.5 | 0.0 | 13 | 9.97E−05 | 17.2 | OK |
| | 300 | 16 | 1.4E−05 | 18.1 | OK | 9.4 | 3.5 | 0.0 | 11 | 2.40E−04 | 17.4 | OK |
| Example 41 | 0 | 25 | 1.2E−07 | 16.7 | OK | 9.1 | 3.5 | 0.0 | 25 | 1.21E−07 | 16.7 | OK |
| | 100 | 21 | 2.1E−06 | 16.7 | OK | — | — | — | — | — | — | — |
| | 200 | 23 | 8.7E−07 | 16.6 | OK | 9.4 | 3.5 | 0.0 | 18 | 3.17E−06 | 15.7 | OK |
| | 300 | 21 | 2.2E−06 | 16.3 | OK | 9.4 | 3.2 | 0.0 | 16 | 1.40E−05 | 16.1 | OK |
| Example 42 | 0 | 23 | 5.8E−07 | 18.0 | OK | 9.3 | 3.5 | 0.0 | 23 | 5.80E−07 | 18.0 | OK |
| | 100 | 19 | 4.3E−06 | 18.0 | OK | — | — | — | — | — | — | — |
| | 200 | 21 | 1.3E−06 | 17.6 | OK | 9.5 | 3.5 | 0.0 | 17 | 7.37E−06 | 16.8 | OK |
| | 300 | 18 | 7.8E−06 | 17.7 | OK | 9.5 | 3.5 | 0.0 | 19 | 3.83E−06 | 16.6 | OK |
| Example 43 | 0 | 26 | 9.1E−08 | 16.6 | OK | 9.5 | 3.5 | 0.0 | 26 | 9.10E−08 | 16.6 | OK |
| | 100 | 22 | 6.6E−07 | 17.3 | OK | — | — | — | — | — | — | — |
| | 200 | 24 | 6.7E−06 | 16.5 | OK | 9.5 | 3.5 | 0.0 | 21 | 4.97E−07 | 16.0 | OK |
| | 300 | 21 | 1.4E−05 | 16.4 | OK | 9.6 | 3.5 | 0.0 | 21 | 6.33E−07 | 15.7 | OK |
| Example 44 | 0 | 21 | 1.0E−06 | 25.9 | OK | 10.6 | 4.0 | 0.0 | 21 | 1.05E−06 | 25.9 | OK |
| | 100 | 18 | 2.1E−06 | 25.4 | OK | — | — | — | — | — | — | — |
| | 200 | 19 | 2.2E−06 | 25.0 | OK | 10.4 | 4.0 | 0.0 | 21 | 1.60E−06 | 23.8 | OK |
| | 300 | 17 | 6.6E−06 | 24.7 | OK | 10.5 | 4.0 | 0.0 | 21 | 5.87E−07 | 23.1 | OK |

The invention claimed is:

1. A write-once-read-many optical recording medium comprising a substrate, an undercoat layer, a recording layer comprising Fe, bismuth and an oxide of bismuth, an overcoat layer and a reflective layer in this order from a laser beam incident plane,
    wherein the write-once-read-many optical recording medium has a reflectivity of 35% or less when a laser is applied to the flat part of the substrate.

2. The write-once-read-many optical recording medium according to claim 1, wherein the recording layer has a thickness of 3 nm to 20 nm, and the overcoat layer has a thickness of 5 nm to 60 nm.

3. The write-once-read-many optical recording medium according to claim 1, wherein the recording layer has a thickness of 3 nm to 20 nm, and the overcoat layer has a thickness of 70 nm to 150 nm.

4. A write-once-read-many optical recording medium comprising a substrate, an undercoat layer, a recording layer comprising Fe and any one of bismuth and an oxide of bismuth, an overcoat layer and a reflective layer in this order from a laser beam incident plane,
    wherein the write-once-read-many optical recording medium has a reflectivity of 35% or less when a laser is applied to the flat part of the substrate.

5. The write-once-read-many optical recording medium according to claim 4, wherein the write-once-read-many optical recording medium satisfies the following conditions (i) to (iii):
    (i) The undercoat layer has a thickness of 10 nm to 150 nm.
    (ii) The recording layer has a thickness of 3 nm to 20 nm.
    (iii) The overcoat layer has a thickness of 5 nm to 60 nm.

6. The write-once-read-many optical recording medium according to claim 4, wherein the write-once-read-many optical recording medium satisfies the following conditions (i) to (ii) and (iv):
    (i) The undercoat layer has a thickness of 10 nm to 150 nm.
    (ii) The recording layer has a thickness of 3 nm to 20 nm.
    (iv) The overcoat layer has a thickness of 70 nm to 150 nm.

7. The write-once-read-many optical recording medium according to claim 4, wherein the undercoat layer comprises any one of an oxide and a nitride.

8. The write-once-read-many optical recording medium according to claim 4, wherein at least any one of the oxide and the nitride is a compound selected from $Al_2O_3$, AlN, SiN and ZrN.

9. The write-once-read-many optical recording medium according to claim 4, wherein at least any one of the overcoat layer and undercoat layer comprises a sulfide, and the sulfide is at least any one compound selected from AgS, AlS, BS, BaS, BiS, CaS, CdS, CoS, CrS, CuS, FeS, GeS, InS, KS, LiS, MgS, MnS, MoS, NaS, NbS, NiS, PbS, SbS, SnS, SrS, WS and ZnS.

10. The write-once-read-many optical recording medium according to claim 4, wherein at least any one of the overcoat layer and undercoat layer comprises $ZnS$—$SiO_2$, and the mixing ratio of ZnS to $SiO_2$ is 70/30 to 90/10 on a molar basis.

11. The write-once-read-many optical recording medium according to claim 4, wherein the reflective layer comprises any one of silver and aluminum.

12. The write-once-read-many optical recording medium according to claim 4, wherein the recording layer comprises any one element selected from Al, Cr, Mn, Sc, In, Ru, Rh, Co, Cu, Ni, Zn, Li, Si, Ge, Zr, Ti, Hf, Sn, Pb, Mo, V and Nb.

13. The write-once-read-many optical recording medium according to claim 4, wherein a recording mark which generates three or more different types of reproducing signal levels is formed and the types of a recording mark is determined based on the reproducing signal levels.

14. The write-once-read-many optical recording medium according to claim 1, wherein at least any one of the overcoat layer and undercoat layer comprises a sulfide, and the sulfide is at least any one compound selected from AgS, AlS, BS, BaS, BiS, CaS, CdS, CoS, CrS, CuS, FeS, GeS, InS, KS, LiS, MgS, MnS, MoS, NaS, NbS, NiS, PbS, SbS, SnS, SrS, WS and ZnS.

15. The write-once-read-many optical recording medium according to claim 1, wherein at least any one of the overcoat layer and undercoat layer comprises $ZnS$—$SiO_2$, and the mixing ratio of ZnS to $SiO_2$ is 70/30 to 90/10 on a molar basis.

16. The write-once-read-many optical recording medium according to claim 1, wherein the reflective layer comprises any one of silver and aluminum.

17. The write-once-read-many optical recording medium according to claim 1, wherein the recording layer comprises any one element selected from Al, Cr, Mn, Sc, In, Ru, Rh, Co, Cu, Ni, Zn, Li, Si, Ge, Zr, Ti, Hf, Sn, Pb, Mo, V and Nb.

18. The write-once-read-many optical recording medium according to claim 1, wherein a recording mark which generates three or more different types of reproducing signal levels is formed and the types of a recording mark is determined based on the reproducing signal levels.

19. The write-once-read-many optical recording medium according to claim 1, wherein the undercoat layer is adjacent to the recording layer and comprises a sulfide as a main component, and the sulfide in the undercoat layer is at least any one compound selected from AgS, AlS, BS, BaS, BiS, CaS, CdS, CoS, CrS, CuS, FeS, GeS, InS, KS, LiS, MgS, MnS, MoS, NaS, NbS, NiS, PbS, SbS, SnS, SrS, WS and ZnS.

20. The write-once-read-many optical recording medium according to claim 1, wherein the undercoat layer is adjacent to the recording layer and comprises $ZnS$—$SiO_2$.

* * * * *